US011764576B2

(12) United States Patent
Matsunaga et al.

(10) Patent No.: US 11,764,576 B2
(45) Date of Patent: Sep. 19, 2023

(54) INFORMATION PROCESSING APPARATUS, INFORMATION PROCESSING METHOD, STORAGE MEDIUM, PORTABLE ELECTRIC GENERATOR, AND RENTAL SYSTEM

(71) Applicant: HONDA MOTOR CO., LTD., Tokyo (JP)

(72) Inventors: Yoshihiro Matsunaga, Wako (JP); Sho Takada, Wako (JP); Mitsuhiro Ito, Wako (JP); Nobuyuki Sasaki, Wako (JP); Ryo Oshima, Wako (JP); Mio Oshima, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 406 days.

(21) Appl. No.: 17/021,119

(22) Filed: Sep. 15, 2020

(65) Prior Publication Data
US 2021/0006070 A1   Jan. 7, 2021

Related U.S. Application Data

(63) Continuation of application No. PCT/JP2018/047510, filed on Dec. 25, 2018.

(30) Foreign Application Priority Data

Mar. 20, 2018 (JP) ................................ 2018-052588

(51) Int. Cl.
H02J 3/00 (2006.01)
G06F 13/38 (2006.01)
H02J 3/32 (2006.01)

(52) U.S. Cl.
CPC ............ *H02J 3/003* (2020.01); *G06F 13/382* (2013.01); *H02J 3/004* (2020.01); *H02J 3/32* (2013.01); *G06F 2213/0042* (2013.01)

(58) Field of Classification Search
CPC .... H02J 3/003; H02J 3/004; H02J 3/32; H02J 13/00001; H02J 13/00002; H02J 2310/70; (Continued)

(56) References Cited

U.S. PATENT DOCUMENTS 9,869,665 B2    1/2018 Chapman, III
2014/0091623 A1*  4/2014 Shippy .................. H02J 7/0068
                                                                      307/31

(Continued)

FOREIGN PATENT DOCUMENTS

JP    2003256542 A    9/2003
JP    2003288539 A    10/2003
(Continued)

OTHER PUBLICATIONS

International Search Report for PCT/JP2018/047510 dated Mar. 19, 2019.

*Primary Examiner* — Ziaul Karim
(74) *Attorney, Agent, or Firm* — Thomas| Horstemeyer, LLP

(57) ABSTRACT

An information processing apparatus comprises an acquisition unit configured to acquire information according to the usage circumstances of the portable electric generator; an estimation unit configured to estimate a type of an electrical device that is connected, based on a measurement result with respect to a voltage and a current when the portable electric generator supplied electric power that is included in the information according to the usage circumstances; and a calculation unit configured to calculate a rental fee associated with an electric power amount supplied by the portable electric generator at the rental destination, using a billing coefficient corresponding to an electrical device estimated by the estimation unit, and the measurement result.

12 Claims, 12 Drawing Sheets

(58) Field of Classification Search
CPC .............. H02J 7/0063; G06F 13/382; G06F 2213/0042; Y02E 60/00; Y04S 10/30; Y04S 10/40; Y04S 50/10; Y04S 50/12; G06Q 30/0645; G06Q 50/06; G06Q 30/04

See application file for complete search history.

(56) References Cited

U.S. PATENT DOCUMENTS

| | | | | |
|---|---|---|---|---|
| 2014/0258142 | A1* | 9/2014 | Yamazaki .............. | H02J 3/32 |
| | | | | 705/307 |
| 2015/0057825 | A1* | 2/2015 | Steele .............. | G01R 19/2513 |
| | | | | 700/297 |
| 2015/0338386 | A1* | 11/2015 | Chapman, III ........ | F01M 11/10 |
| | | | | 702/50 |
| 2017/0338665 | A1* | 11/2017 | Long .............. | H02J 13/00002 |

FOREIGN PATENT DOCUMENTS

| | | |
|---|---|---|
| JP | 2017099237 A | 6/2017 |
| WO | 2017145510 A1 | 8/2017 |
| WO | 2019181127 A1 | 9/2019 |

* cited by examiner

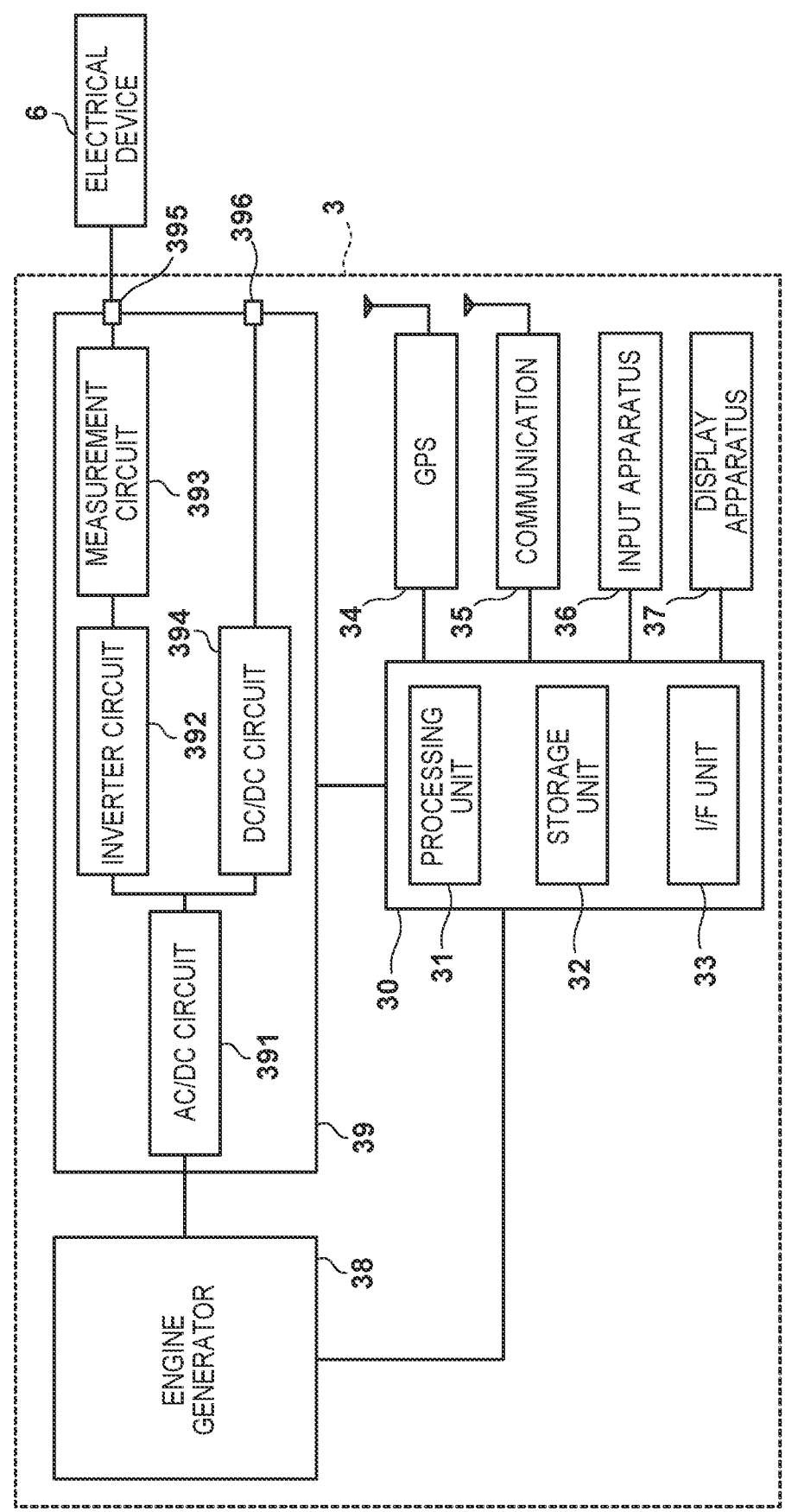

INFORMATION PROCESSING APPARATUS, INFORMATION PROCESSING METHOD, STORAGE MEDIUM, PORTABLE ELECTRIC GENERATOR, AND RENTAL SYSTEM

CROSS-REFERENCE TO RELATED APPLICATION(S)

This application is a continuation of International Patent Application No. PCT/JP2018/047510 filed on Dec. 25, 2018, which claims priority to and the benefit of Japanese Patent Application No. 2018-052588 filed on Mar. 20, 2018, the entire disclosures of which are incorporated herein by reference.

TECHNICAL FIELD

The present invention relates to an information processing apparatus, an information processing method, a storage medium, a portable electric generator and a rental system.

BACKGROUND ART

A portable electric generator is known as a portable power supply apparatus. In addition to use in the home, because a portable electric generator can be easily carried, it is also possible to use a portable electric generator away from the home, such as at a campsite, and a portable electric generator can supply electric power to various kinds of electrical devices. On the other hand, portable electric generators are relatively expensive for individuals to purchase, and although portable electric generators are being made more compact, they still remain a reasonably large size. Hence, there is a tendency for users to refrain from purchasing a portable electric generator in a case where the principal purpose is use away from the home or the like, and the portable electric generator will not be used on a routine basis. Therefore, rental services that allow users to rent portable electric generators are provided to meet the power supply needs of such users.

In PTL1, a system is proposed in which battery pack data that shows the usage circumstances of a rental battery pack constituted by a secondary battery is transmitted to a rental company through a network, and a fee for using the battery pack is calculated and charged based on the number of charge and discharge cycles which is obtained from the battery pack data.

CITATION LIST

Patent Literature

PTL1: Japanese Patent Laid-Open No. 2003-288539

SUMMARY OF INVENTION

Technical Problem

However, the following problems exist with regard to the aforementioned prior art. For example, if a battery pack is rented out as in the aforementioned prior art, the residual amount of the storage battery can be calculated and a rental fee can be calculated. However, if charging is performed with an external electric generator such as a power supply apparatus equipped with an electric generator, the usage amount during the rental period cannot be ascertained by means of only a residual amount.

On the other hand, in the case of a power supply apparatus equipped with an electric generator, it is conceivable to calculate a rental fee based on the residual quantity of fuel in the electric generator. However, if the electric generator is refilled with fuel, it is similarly not possible to ascertain the amount of electricity generated. Further, in a case where the electric generator is used in a manner that exceeds the rated current of the electric generator, or a case where the electric generator is used in a manner such that the amount of discharge within a predetermined time unit exceeds a predetermined value, it will hasten the deterioration of various components in an engine generation section. In addition, the electric power characteristics at start-up and during use differ depending on the type of electrical device to which the electric power is supplied, and the degree of deterioration of various components will differ depending on differences according to the discharging at such times. If rental fees can be calculated in a manner that also takes into consideration such type of deterioration of an electric generator, fee setting can be performed more precisely, which will be advantageous for both the rental company and the user.

An objective of the present invention is to suitably acquire the usage circumstances of a portable electric generator at a rental destination, and suitably calculate a rental fee in accordance with the amount of electric power generated by the portable electric generator as well as the usage circumstances thereof.

Solution to Problem

According to the present invention there is provided an information processing apparatus managing usage circumstances at a rental destination of a portable electric generator configured to supply electric power to a detachably connected electrical device, including: an acquisition unit configured to acquire information according to the usage circumstances of the portable electric generator; an estimation unit configured to estimate a type of an electrical device that is connected, based on a measurement result with respect to a voltage and a current when the portable electric generator supplied electric power that is included in the information according to the usage circumstances; and a calculation unit configured to calculate a rental fee associated with an electric power amount supplied by the portable electric generator at the rental destination, using a billing coefficient corresponding to an electrical device estimated by the estimation unit, and the measurement result.

Further, according to the present invention there is provided an information processing method for an information processing apparatus managing usage circumstances at a rental destination of a portable electric generator configured to supply electric power to a detachably connected electrical device, including: acquiring information according to the usage circumstances of the portable electric generator; estimating a type of an electrical device that is connected, based on a measurement result with respect to a voltage and a current when the portable electric generator supplied electric power that is included in the information according to the usage circumstances; and calculating a rental fee associated with an electric power amount supplied by the portable electric generator at the rental destination, using a billing coefficient corresponding to an electrical device that is estimated by the estimating, and the measurement result.

Further, according to the present invention there is provided a non-transitory computer-readable storage medium storing a program that operates in an information processing apparatus managing usage circumstances at a rental destination of a portable electric generator configured to supply electric power to a detachably connected electrical device, including: an acquisition step of acquiring information according to the usage circumstances of the portable electric generator; an estimation step of estimating a type of an electrical device that is connected, based on a measurement result with respect to a voltage and a current when the portable electric generator supplied electric power that is included in the information according to the usage circumstances; and a calculation step of calculating a rental fee associated with an electric power amount supplied by the portable electric generator at the rental destination, using a billing coefficient corresponding to an electrical device that is estimated in the estimation step, and the measurement result.

Furthermore, according to the present invention there is provided a portable electric generator configured to supply electric power to a detachably connected electrical device, including: at least one of an engine generator and a storage battery configured to supply electric power to the connected electrical device; a measurement unit configured to measure a voltage and a current when electric power is supplied by at least one of the engine generator and the storage battery; a transmission unit configured to transmit a measurement result that is measured by the measurement unit to a communicably connected external apparatus; and a control unit configured to, upon receiving a response to the transmission by the transmission unit from the external apparatus, in a case where warning information is included in response information that is received, display information indicating that a surcharge will be imposed as information for a user on a display unit.

In addition, according to the present invention there is provided a portable electric generator configured to supply electric power to a detachably connected electrical device, the portable electric generator comprising: at least one of an engine generator and a storage battery configured to supply electric power to the connected electrical device; a measurement unit configured to measure a voltage and a current when electric power is supplied to the connected electrical device by at least one of the engine generator and the storage battery; and a storage unit configured to store waveform information according to a voltage and a current measured by the measurement unit, and information according to charging and discharging; wherein: the waveform information and the information according to charging and discharging are used for estimating a type of the connected electrical device and usage circumstances of the connected electrical device, and a rental fee of the portable electric generator is calculated based on the type of the connected electrical device and the usage circumstances of the estimated electrical device.

Further, according to the present invention there is provided a rental system including a portable electric generator configured to supply electric power to a detachably connected electrical device, and an information processing apparatus managing usage circumstances of the portable electric generator at a rental destination, wherein: the portable electric generator includes: at least one of an engine generator and a storage battery configured to supply electric power to the connected electrical device, a measurement unit configured to measure a voltage and a current when electric power is supplied by at least one of the engine generator and the storage battery, a transmission unit configured to transmit a measurement result that is measured by the measurement unit to a communicably connected external apparatus, and a control unit configured to, upon receiving a response to the transmission by the transmission unit from the external apparatus, in a case where warning information is included in response information that is received, display information indicating that a surcharge will be imposed as information for a user on a display unit; and the information processing apparatus includes: an acquisition unit configured to acquire information according to the usage circumstances of the portable electric generator; an estimation unit configured to estimate a type of a connected electrical device based on a measurement result with respect to a voltage and a current when the portable electric generator supplied power which is included in the information according to the usage circumstances, a calculation unit configured to calculate a rental fee associated with an electric power amount supplied by the portable electric generator at the rental destination, using a billing coefficient corresponding to an electrical device that is estimated by the estimation unit, and the measurement result; and a notification unit configured to notify a rental fee calculated by the calculation unit to the portable electric generator.

Advantageous Effects of Invention

According to the present invention, the usage circumstances of a portable electric generator at a rental destination can be suitably acquired, and a rental fee can be suitably calculated according to the amount of electric power generated by the portable electric generator and the usage circumstances thereof.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 13 is a block diagram of a portable electric generator according to a different example.

DESCRIPTION OF THE EMBODIMENTS

First Embodiment

<Configuration of System>

Figure 1:
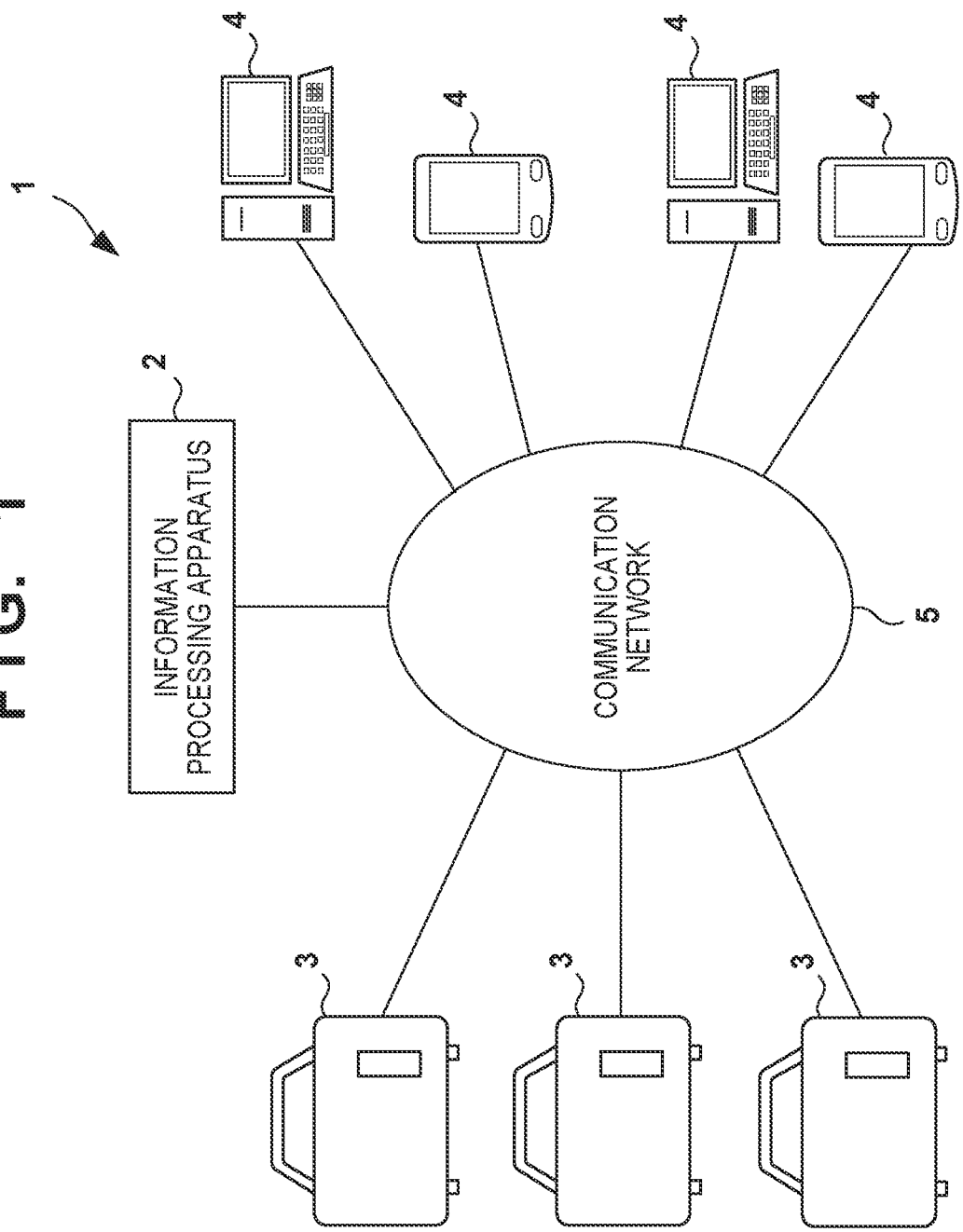
FIG. 1 is a schematic diagram of a rental system according to one embodiment of the present invention.

Hereinafter, a first embodiment of the present invention will be described. In the present embodiment, a rental system 1 in a case where a portable electric generator is equipped with a communication function will be described. FIG. 1 is a schematic diagram of the rental system 1. The rental system 1 includes an information processing apparatus 2 that is a management server, a plurality of portable electric generators 3, and a plurality of terminals 4 which are communicably connected through a communication network 5. Although three of the portable electric generators 3 are illustrated in the example in FIG. 1, the example illustrated in FIG. 1 is not intended to limit the present invention, and a large number of the portable electric generators 3 can constitute part of the system 1. Likewise, although four of the terminals 4 are illustrated in the example in FIG. 1, a large number of the terminals 4 can constitute part of the system 1. Note that, the information processing apparatus 2 and the terminals 4 can be external apparatuses with respect to the plurality of portable electric generators 3.

The information processing apparatus 2 is a computer that functions as a management server in the rental system 1, and manages information according to respective portable electric generators that are provided by service providers, described later, and in particular, calculates rental fees for the portable electric generators. A portable electric generator (hereinafter, referred to simply as "electric generator") 3 is an apparatus that supplies electric power to an electrical device, and is a portable type apparatus and not a stationary type apparatus. Accordingly, the electric generator 3 can be carried to a usage site in accordance with the intended use of the user, such as for leisure use, business use, or use in an emergency situation.

The terminal 4 is a computer that is used by a service provider that operates a rental service for renting the electric generator 3 or the like, and for example is a personal computer or a hand-held device. The terminal 4 is equipped with a display device and a communication device. The term "service provider" refers to a merchant who provides a product or renders a service to a user of the electric generator 3. It is assumed that different merchants utilize the respective terminals 4.

In the rental system 1, the information processing apparatus 2 gathers information according to the usage circumstances of the electric generator 3 from the electric generator 3 through the communication network 5 such as the Internet, and provides the gathered information to the terminal 4. By means of the information that is provided, the service provider acquires information according to the usage circumstances of the electric generator 3 of each user and calculated rental fees. The operator of the information processing apparatus 2 may also provide the information in exchange for a consideration from the service provider. Based on information according to the usage circumstances of the electric generator 3, the user of the electric generator 3 is notified of various kinds of information such as usage guidance information, or information warning of an additional rental fee or the like, and the rental fee may be discounted if the electric generator 3 is used in an appropriate manner.

<Portable Electric Generator>

Figure 2:
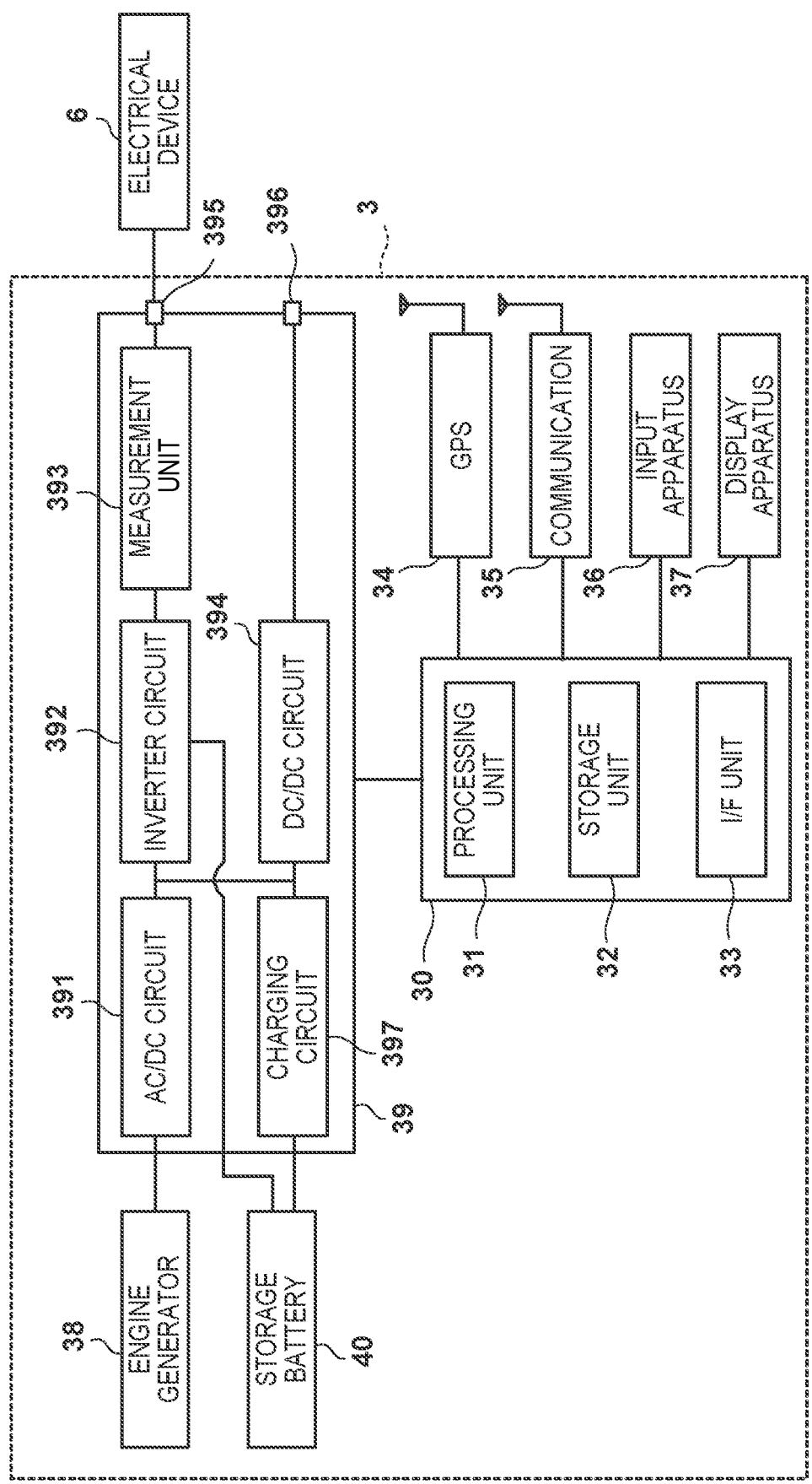
FIG. 2 is a block diagram of a portable electric generator according to one embodiment of the present invention.

FIG. 2 is a block diagram of the electric generator 3. The electric generator 3 of the present embodiment is an electric generator of a type that is equipped with both an engine generator 38 and storage battery 40. The engine generator 38 of the present embodiment is driven by fuel to generate alternating-current electric power. The fuel is, for example, gasoline, liquefied petroleum gas or hydrogen. The storage battery 40 is a battery in which, for example, lithium ions, nickel-metal hydride, or nickel-cadmium is employed as a constituent material, and which outputs a DC voltage of 48 V or the like to an inverter circuit 392 or a DC/DC circuit 394.

A power supply circuit 39 is a circuit that converts a voltage generated by the engine generator 38 into a predetermined alternating current or direct current. The AC/DC circuit 391 has a rectifying and smoothing circuit that rectifies and smooths an alternating current generated by the engine generator 38, or the like. The inverter circuit 392 converts a direct current generated by the AC/DC circuit 391 or a direct current supplied from the storage battery 40 into stable alternating current of a predetermined frequency. The charging circuit 397 charges the storage battery 40 based on electric power generated by the engine generator 38. The electric generator 3 illustrated in FIG. 2 is capable of supplying electric power that is stored in the storage battery 40 to an electrical device 6 even after the fuel of the engine generator 38 runs out.

A measurement circuit 393 includes a current sensor and a voltage sensor, and measures an AC voltage and an AC current supplied from the inverter circuit 392 to an electrical device 6 connected to an AC outlet 395, and outputs the measurement result to a control circuit 30. The electrical device 6 that is capable of driving by means of alternating-current electric power is detachably connected to the AC outlet 395. In a case where the electric generator 3 is used for leisure purposes, examples of the electrical device 6 that may be mentioned include a cooking device, an air conditioner, a television, a lighting device, and a dryer. Examples of the cooking device that may be mentioned include a hot plate, a kettle, a microwave oven, a grill, and a blender. In a case where the electric generator 3 is used for business purposes, examples of the electrical device 6 that may be mentioned include an electric power tool, a large-size lighting apparatus, and a compressor.

The DC/DC circuit 394 converts the level of a DC voltage that is output from the AC/DC circuit 391, and supplies an operating voltage to the control circuit 30 and the like, and outputs an operating voltage to a DC outlet 396. The electrical device 6 that can be driven by DC power is detachably connected to the DC outlet 396.

The control circuit 30 is a circuit that performs control of the electric generator 3. The control circuit 30 includes a processing unit 31, the storage unit 32 and an I/F (interface) unit 33. The processing unit 31 is a processor that is typified by a CPU, and executes a program stored in the storage unit 32. The storage unit 32 is a storage device such as a RAM, a ROM, or a hard disk. In addition to a program that the processing unit 31 executes, various kinds of data are also stored in the storage unit 32. The I/F unit 33 relays signals that are exchanged between an external device and the processing unit 31.

A GPS sensor 34 detects the current position of the electric generator 3. A communication apparatus 35 is a radio communication apparatus which carries out communication of information between the information processing apparatus 2 and the terminal 4 through the communication network 5. An input apparatus 36 is an apparatus that accepts input of operations by a user of the electric generator 3, and for example is a plurality of switches. The display apparatus 37 is an apparatus that displays information to a user of the electric generator 3, and for example is an image display apparatus such as a liquid crystal display or is a light emitting device such as an LED. A touch panel-type liquid crystal display may be adopted. In such a case, the display apparatus 37 will include a part of the input apparatus 36.

The processing unit 31 transmits information regarding the current position that is detected by the GPS sensor 34 and a measurement result of the measurement circuit 393 to the information processing apparatus 2 by means of the communication apparatus 35, and executes processing of a program stored in the storage unit 32. A measurement result of the measurement circuit 393 can be utilized as information according to the type of electrical device 6 connected to the AC outlet 395 of the electric generator 3, and in particular can be utilized to estimate the type of electrical device 6. Electric power that is supplied to the electrical device 6 exhibits a waveform whose characteristics are determined by the type of electrical device 6. The type of the electrical device 6 that is connected can be estimate based on feature amount of the waveform. Further, by means of the waveform, the electric power supply amount can be ascertained, and the usage method can be identified.

The feature amount are, for example, an apparent power and a power factor. The power factor is obtained by dividing the effective power by the apparent power, or is determined as the cosine ($\cos \theta$) of the phase difference between the voltage and the current. In the latter case, the measurement circuit 393 measures a phase difference $\theta$. In addition, the feature amount may include a time period from when the electrical device 6 starts up until the electrical device 6 operates stably, or a peak value of a starting current flowing to the electrical device 6 when the electrical device 6 starts up. The relation between the kinds of electrical device 6 and the feature amount can be represented in advance in data format as a feature amount map, and the type of electrical device 6 can be estimated by comparing the feature amount measured by the measurement circuit 393 with the feature amount map.

Figure 4:
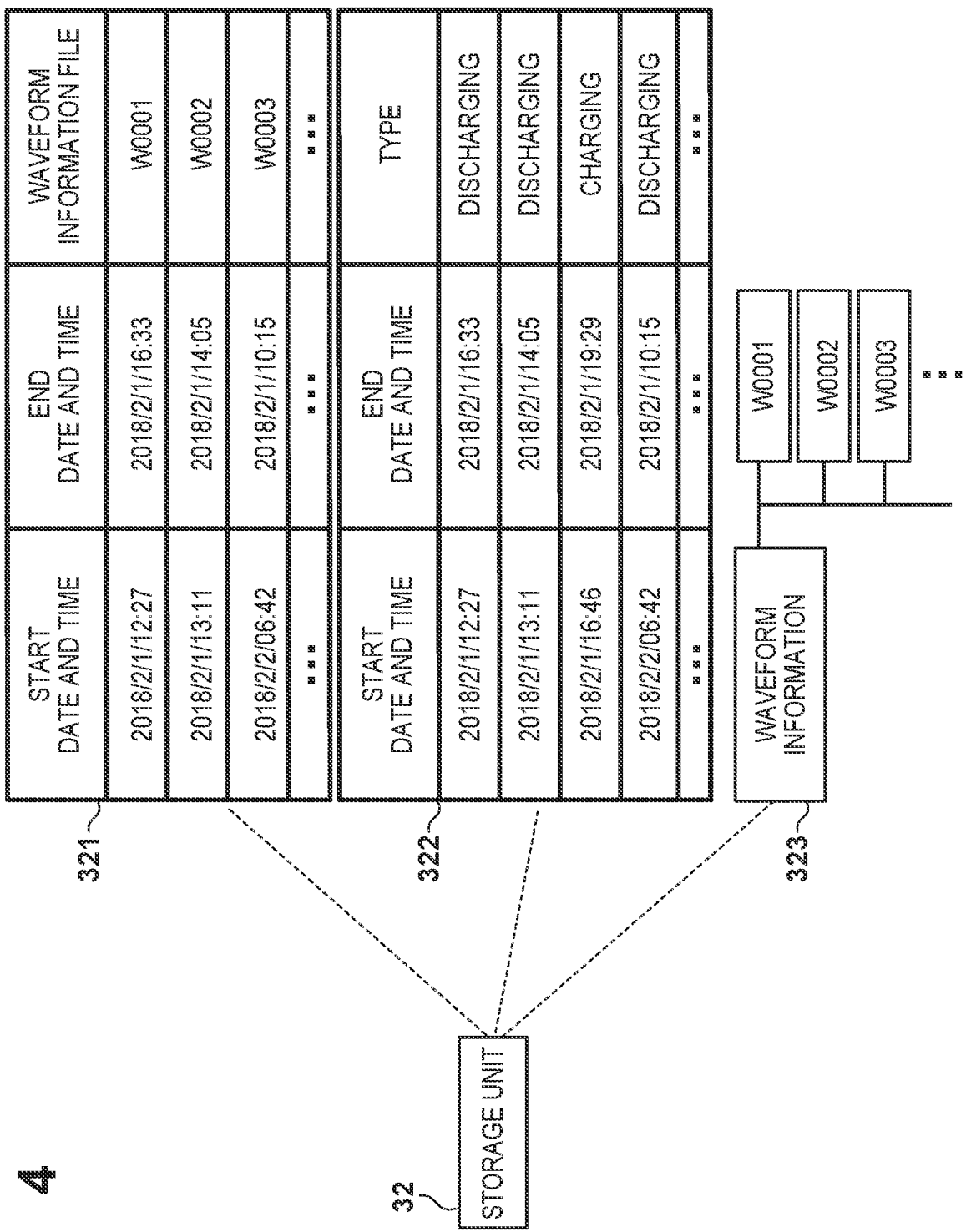
FIG. 4 is a view illustrating information that is held in a storage unit 32 of the portable electric generator.

FIG. 4 illustrates various kinds of information 321 to 323 stored in the storage unit 32 during use, in the electric generator 3. Various kinds of information according to the stored waveforms mentioned above is stored as the information 321. The item "Start Date and Time" shows the date and time that storing of the waveform started, and the item "End Date and Time" shows the date and time that storing of the relevant waveform ended. The item "Waveform Information File" is an identifier that shows the file of stored waveform information. The waveform information file that corresponds to the relevant identifier is included in the waveform information 323.

Information according to charging/discharging of the engine generator 38 and the storage battery 40 is stored as the information 322. The item "Start Date and Time" shows the date and time that recording of charging/discharging started, and the item "End Date and Time" shows the date and time that the relevant the recording of charging/discharging ended. The item "Type" shows the type of the stored charging/discharging, for example, the "Type" item includes information indicating "Charging" or "Discharging". In addition to storing such information according to charging/discharging, a configuration may be adopted in which information according to the amount of discharging and the amount of charging, respectively, is stored. Further, with respect to "Discharging", it is desirable that information is stored in a manner that enables identification of which one among the engine generator 38 and the storage battery 40 was used for discharging.

The information stored in the storage unit 32 may be transferred by the communication apparatus 35 through the communication network 5 to the information processing apparatus 2 or to the terminal 4 of the service provider that provided the relevant electric generator 3. Alternatively, when the relevant electric generator 3 is returned to the service provider, the information stored in the storage unit 32 may be read to the terminal 4 through a USB (universal serial bus) connection or the like. The various kinds of information described above are used for calculating a rental fee that is described later.

<Information Processing Apparatus>

Figure 3:
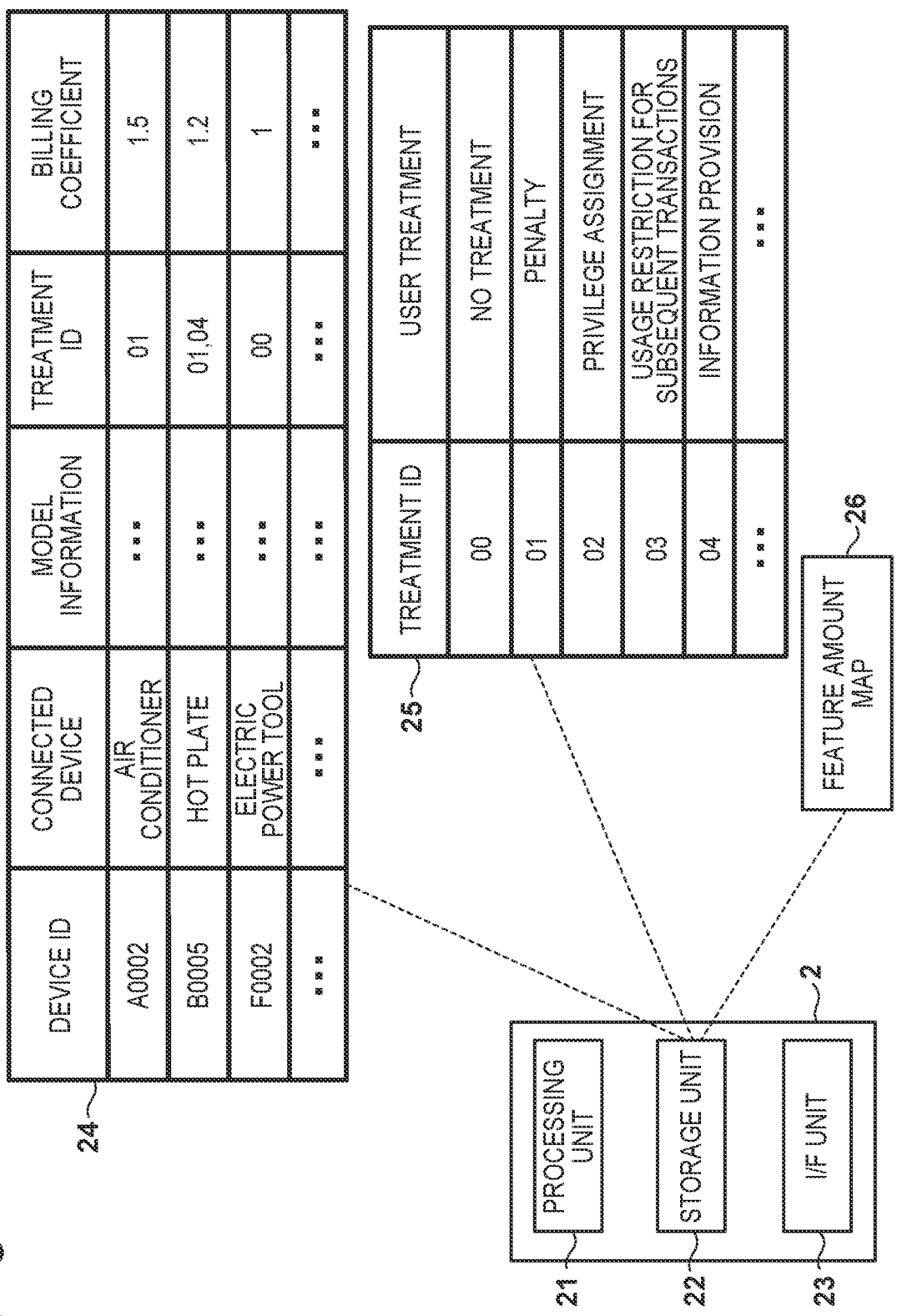
FIG. 3 is a block diagram of an information processing apparatus according to one embodiment of the present invention.

FIG. 3 is a block diagram of the information processing apparatus 2 that is a management server that manages the rental system 1. The information processing apparatus 2 includes a processing unit 21, a storage unit 22 and an I/F (interface) unit 23. The processing unit 21 is a processor that is typified by a CPU, and reads a program stored on a ROM or a HDD included in the storage unit 22 to a RAM and executes the program. The I/F unit 23 relays signals that are exchanged between an external device and the processing unit 21. The I/F unit 23 includes a wired or wireless communication interface that is capable of communicating with the electric generator 3 and the terminal 4 through the communication network 5. The storage unit 22 is a storage device such as a RAM, a ROM or a hard disk.

Various kinds of data are stored in the storage unit 22, in addition to a program that the processing unit 31 executes. In the example illustrated in FIG. 3, databases 24 to 26 are illustrated as examples of data stored in the storage unit 22. The database 24 is a database which stores data relating to electrical devices connected to the electric generator 3. The item "Device ID" is an identifier that is assigned in order to identify individual electrical devices. In the case of the present embodiment, the identifier is assigned in advance to a predetermined electrical device. However, a configuration can also be adopted in which the identifier is assigned when performing communication. Further, when a new electrical device that the information processing apparatus 2 does not recognize is used with the electric generator 3, the aforementioned kinds of information may be acquired and a new identifier assigned, and the new electrical device may be registered in the database 24.

The item "Connected Device" is information showing the kinds of electrical device 6 currently connected to the electric generator 3. In the case of the present embodiment, the database 26 is a database which stores a feature amount map. The processing unit 21 estimates the type of an electrical device 6 that is currently connected to the electric generator 3 by comparing information according to the type of electrical device 6 that is transmitted from the electric generator 3 (in this case, a measurement result of a measurement circuit 398) with the feature amount map, and stores the estimation result as a "connected device". Note that, the information according to the type of electrical device 6 that is transmitted from the electric generator 3 may be the actual measurement result of the measurement circuit 398, or may be feature amount calculated on the electric generator 3 side. Further, in the present embodiment, although a form is adopted in which the type of electrical device 6 is estimated on the information processing apparatus 2 side, a form may be adopted in which the type of the electrical device 6 is estimated on the electric generator 3 side, and the estimation result is transmitted to the information processing apparatus 2 as information according to the type of the electrical device 6.

The item "Model Information" is information according to the specifications of the connected device. For example, the information pertains to the drive system, the inrush current, the electric power consumption in a steady state, or the like. The item "Treatment ID" is an identifier indicating the classification of the treatment to be performed with respect to the user in a case where supply of electric power to the relevant connected device is performed by means of the electric generator 3. The treatment ID is associated with information indicating the actual user treatment in the database 25 that is described later. The item "billing coefficient" shows a discount rate or a surcharge with respect to the rental fee for the user that rented the electric generator 3, in a case where supply of electric power to the relevant connected device was performed by the electric generator 3.

The database 25 is a database that shows the contents of the user treatment that is associated with each treatment ID. In the present embodiment, the treatment to be performed with respect to the user is controlled for each connected device that the user connects to the electric generator 3 and supplies power to, and the contents of the respective treatments are defined in detail. The administrator registers each treatment in advance, and provides the treatments to each terminal 4 that the service provider possesses. The item "Treatment ID" is as described above. The item "User Treatment" shows the contents of the user treatments associated with the respective treatments.

For example, to provide no special treatment is defined as the content of the response with respect to the treatment ID "00". Similarly, treatment that involves imposing a penalty on the user is defined with respect to the treatment ID "01". For example, treatment such as adding a surcharge to the rental fee or reducing points that are assigned to the user is performed. In this case, the term "points" refers to points that are assigned to the respective users, and upon a user accumulating a certain number of points, a discount coupon to be used for subsequent transactions may be issued to the user or a free gift or the like may be given to the user. Treatment that involves assigning a special privilege to the user is defined with respect to the treatment ID "02". For example, the treatment may be to discount the rental fee or increase the number of points that are assigned. Treatment that involves imposing a usage restriction for subsequent transactions is defined with respect to the treatment ID "03". For example, the treatment may be to restrict the type of electric generator 3 that can be rented or the rental time period, or to prohibit the user from renting an electric generator 3 for a fixed period. Treatment that involves providing the user with information such as information relating to the method of use for the relevant connected device is defined with respect to the treatment ID "04".

According to the present embodiment, the aforementioned user treatment is determined according to the kind or usage method of the electrical device that the user connected (hereinafter, referred to as "connected device") to the electric generator 3. For example, in a case where the electric generator 3 is utilized with a predetermined electrical device (hereinafter, referred to as "designated device") or in accordance with a predetermined usage method, some type of special privilege is assigned to the relevant user, while in a case where the electric generator 3 is utilized with an electrical device other than a designated device or by a usage method other than a designated usage method, some type of penalty is imposed on the relevant user or some type of information is provided to the relevant user.

<Processing of Electric Generator 3>

Figure 5:
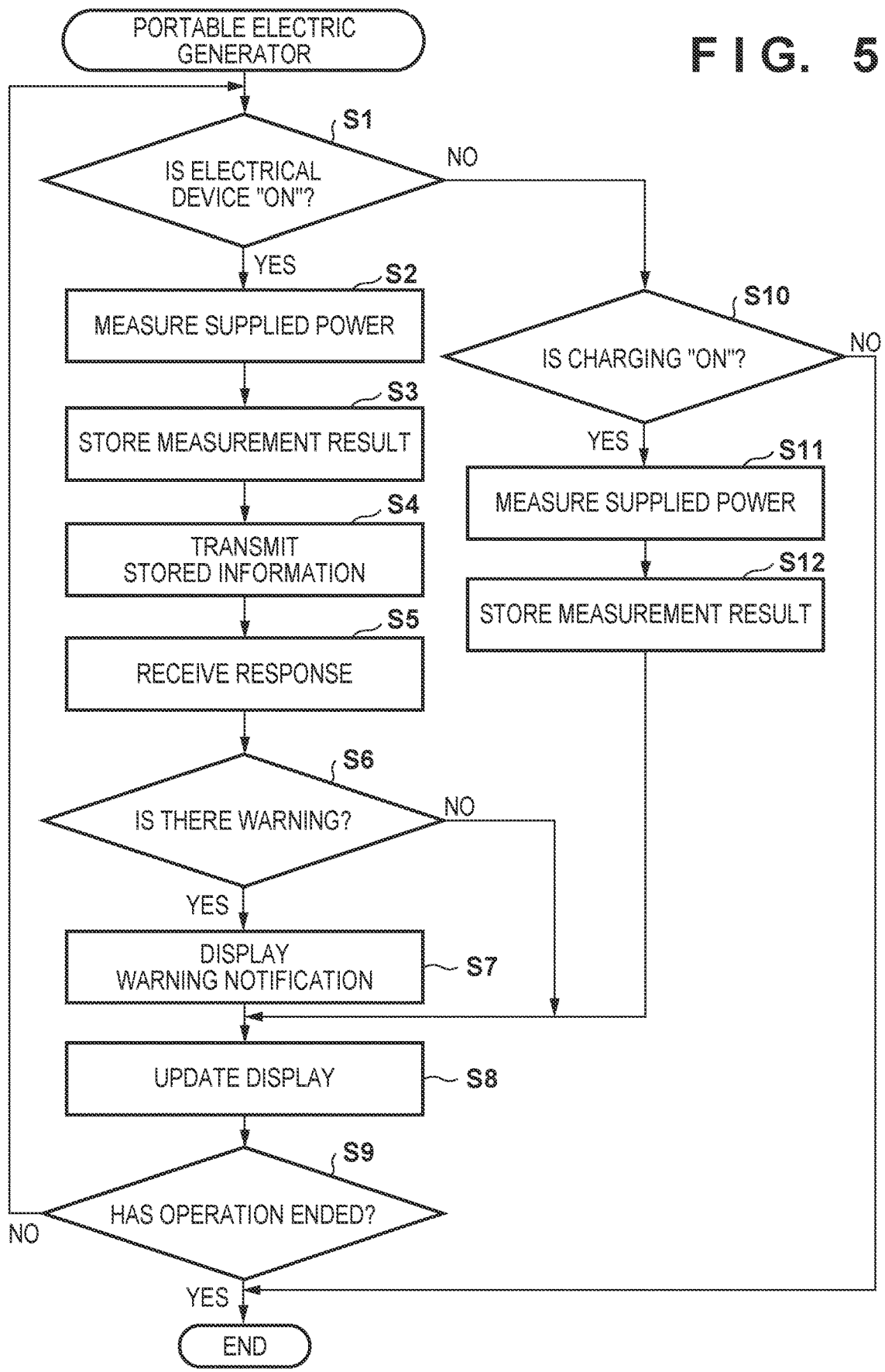
FIG. 5 is a flowchart illustrating an example of processing executed by the portable electric generator.

Hereunder, an example of processing in the rental system 1 will be described. First, referring to FIG. 5, an example of processing that measures and stores the usage circumstances with respect to the electric generator 3 will be described. The processing described hereunder is implemented by, for example, the processing unit 31 reading a control program that is stored in advance on the ROM or HDD of the storage unit 32 to the RAM and executing the control program. When an operation for discharging or charging is started at the electric generator 3, the processing in S1 is executed. Note that, the electric generator 3 is activated by the engine generator 38 starting up and generating electric power. The engine generator 38, for example, is started up upon the user performing a start-up operation.

In S1, the processing unit 31 determines whether or not electric power is being supplied to the electrical device 6 (the electrical device is "ON"). If electric power is being supplied, the processing unit 31 proceeds to S2, and if not the processing unit 31 proceeds to S10. In S2, the processing unit 31 uses the measurement circuit 393 to measure the supplied power, and in S3 the processing unit 31 stores the measurement result (date and time of discharge and waveform information) in the storage unit 32. That is, the information 321 to 323 shown in FIG. 4 is stored at this time. Further, information that identifies whether the electric power that was used was generated by the engine generator 38 or was electric power that was stored in the storage battery 40 may be included in the measurement result. Next, in S4, the processing unit 31 transmits the measurement result stored in the storage unit 32 to the information processing apparatus 2 through the communication network 5 together with other parameters. In this case, the other parameters include, for example, information regarding the current position detected by the GPS sensor 34, information relating to the electric generator 3, and information relating to the electrical device 6 that is connected. Note that, it is desirable that the transmission in S4 is performed at fixed intervals. Since the communication load will increase if measurement results are always transmitted in real time, it is assumed that the transmission is performed intermittently. Note that, with respect to the interval, in order to display a warning screen or the like that is described later, the interval may be set to a short period when the electric generator 3 is activated or when a new load is connected, and may be set to a longer period when the electric generator 3 transitions to a steady state. Further, a configuration may also be adopted so that transmission of stored information is performed after the supply of electric power to the relevant connected device is stopped after the electric generator 3 transitioned to a steady state.

Next, in S5, the processing unit 31 receives response information from the information processing apparatus 2. Although the details of the response information will be described later, the response information includes at least warning information or fee information that is based on the electrical device 6 which is estimated by the information processing apparatus 2. Next, in S6, the processing unit 31 determines whether or not warning information is included in the received response information. If warning information is not included, the processing unit 31 proceeds to S8, while if warning information is included, the processing unit 31 proceeds to S7. In this case, the "warning information" is information for notifying the user that a connected device for which the load is higher than that of a connected device with which the relevant electric generator 3 can stably operate is connected to the electric generator 3, and is also information for notifying the user in advance that for this reason an extra rental fee will be charged.

Figure 8:
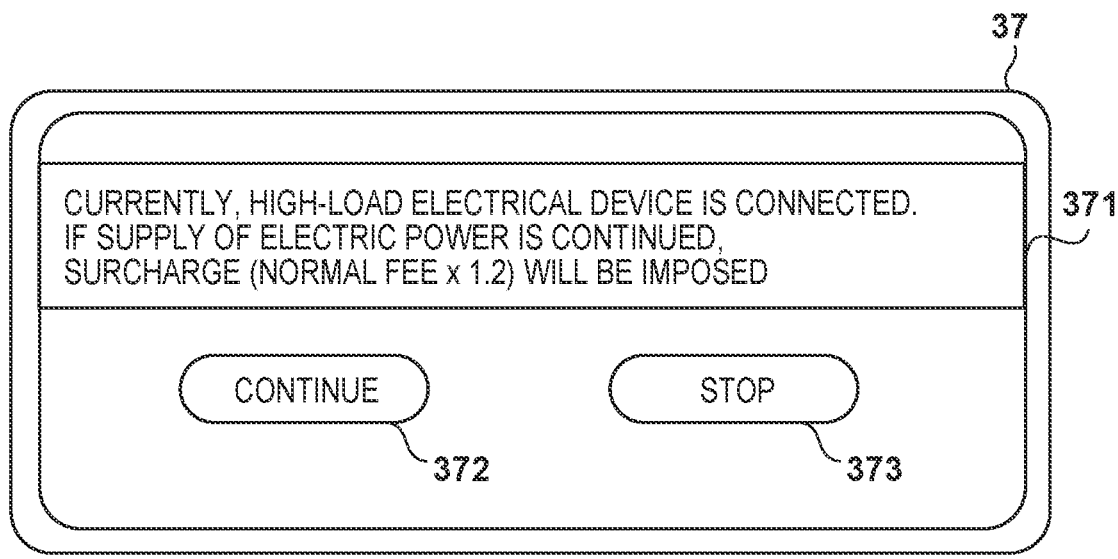
FIG. 8 is a view illustrating an example of a display on a display apparatus 37 of the portable electric generator.

In S7, in order to warn the user that a high-load connected device is connected, the processing unit 31 displays a warning screen on the display apparatus 37 in accordance with the warning information included in the response information described above. That is, screen information for a warning screen is also included in the response information. An example of the warning screen is illustrated in FIG. 8. As illustrated in FIG. 8, on a warning screen 371, a message indicating that a surcharge will be imposed if usage of the electric generator 3 is continued because a high-load electrical device is connected is displayed, and together with the message, buttons 372 and 373 are displayed that allow the user to select whether or not to continue to supply electric power to the connected device in question. The button 372 is a button for instructing the electric generator 3 to continue to supply electric power, and the button 373 is a button for instructing the electric generator 3 to stop supplying electric power. If the user inputs an instruction to continue supplying electric power, for example, a rental fee that is a surcharge of 1.2 times relative to the standard fee is added with respect to the amount of discharge during use. Note that, although in this case processing is described that corresponds to an electrical device with a load of a level which the electric generator 3 is capable of supporting even though the electrical device has a high load, for example, in a case where a device is connected which would significantly accelerate the deterioration of various components of the engine generator 38, control may be performed to display a warning screen and, together therewith, to stop the supply of electric power. In such a case, it is desirable to display a message indicating that the supply of electric power was stopped as well as the reason for stopping the supply of electric power on the display apparatus 37. When the processing in S7 ends, the processing unit 31 proceeds to S8.

On the other hand, if it is determined in S1 that power is not being supplied, in S10 the processing unit 31 determines whether or not charging of the storage battery 40 is being performed by the engine generator 38. If charging is being performed, the processing unit 31 proceeds to S11, and if not the processing unit 31 ends the present processing flow. In S11, the processing unit 31 performs measurement of the charging by means of the charging circuit 397. In S12, the processing unit 31 stores the charging result (charging date and time and charged amount) in the storage unit 32, and then proceeds to S8. That is, the information 322 illustrated in FIG. 4 is stored at this time. The measurement in question may be performed by the charging circuit 397 itself, or may be performed by the measurement circuit 393. Alternatively, a dedicated measurement circuit may be separately provided. Further, although an example in which the charging result is stored only in the storage unit 32 has been described here, the relevant charging result may also be transmitted through the communication network 5 to the information processing apparatus 2, in the same manner as the measurement result is transmitted in S4. By this means, the information processing apparatus 2 can acquire the measurement result and the charging result as usage circumstances of the electric generator 3, that is, can acquire information according to charging/discharging. Hence, the information processing apparatus 2 can identify the usage method of the user based on the relevant charging/discharging information, and can implement more detailed user treatment. For example, in a case where charging is repeated more than necessary, the information processing apparatus 2 may be configured to determine that the electric generator 3 is being used according to a usage method that violates the terms of use with respect to the electric generator 3, and to impose a penalty on the user.

Figure 9:
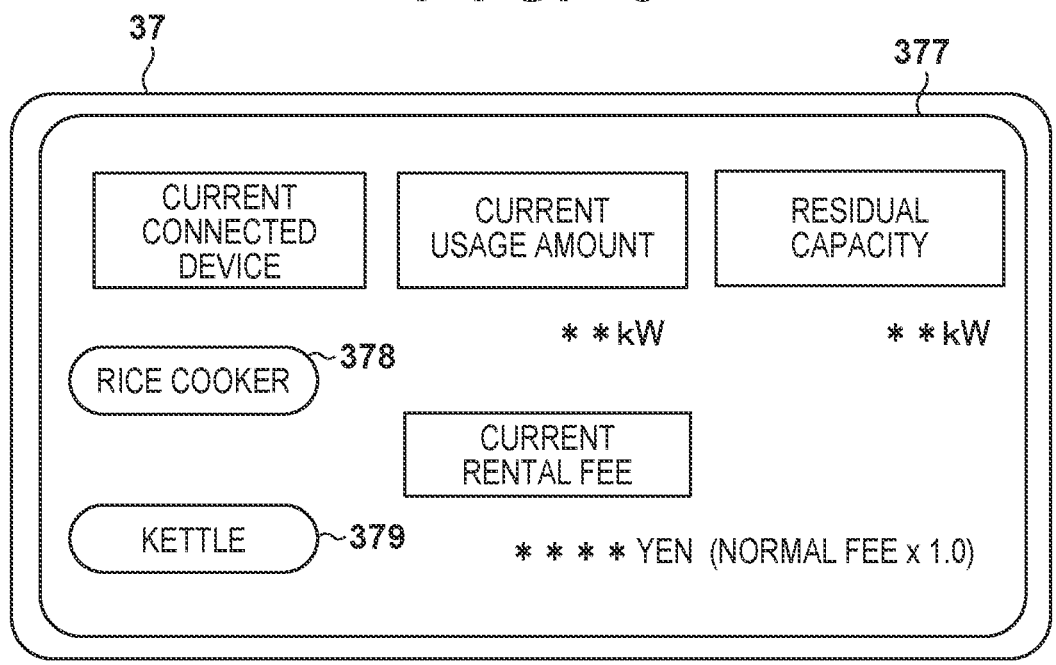
FIG. 9 is a view illustrating an example of a display on a display apparatus 37 of the portable electric generator.

In S8, the processing unit 31 updates the display of the screen that is displayed on the display apparatus 37 during use of the electric generator 3, based on the response information or measurement result received in S5, and then proceeds to S9. The screen illustrated in FIG. 9 is an example of a screen that is displayed on the display apparatus 37 when the electric generator 3 is operating. The screen information of a screen 377 that is the screen in question may be included in response information that is generated by the information processing apparatus 2 and transmitted to the electric generator 3 in S26, or may be generated by the electric generator 3 using the response information.

The screen 377 can be constituted by including buttons 378 and 379 showing the currently connected devices, the current amount of used electric power, the current rental fee, and the residual capacity. Note that, the present invention is not limited to this screen configuration, and the screen may be constituted by adding other various kinds of information. When the button 378 or button 379 is selected, information according to the relevant connected device is displayed (not illustrated in the drawings). For example, the aforementioned guidance information that shows the method for using the relevant connected device may be displayed. The screen 377 is preferably updated each time response information is received from the information processing apparatus 2.

In S9, the processing unit 31 determines whether or not the operation to supply electric power or the charging operation has ended. If the operation has not ended, the processing unit 31 returns the processing to S1, while if the operation has ended, the processing unit 31 ends the present processing flow.

<Processing of Information Processing Apparatus 2>

Next, an example of processing of the information processing apparatus 2 will be described referring to FIG. 6. The processing described hereunder is implemented by, for example, the processing unit 21 reading a control program that is stored in advance on the ROM or HDD of the storage unit 22 to the RAM and executing the control program. Note that, in the present flowchart it is assumed that the charging result stored in S12 is also transmitted in addition to the measurement result that is transmitted from the electric generator 3 in S4. In a case where the charging result is not transmitted, the processing in S23 described hereunder is skipped.

In S21, the processing unit 21 receives the measurement result and charging result (information relating to the usage circumstances) that are transmitted by the electric generator 3 in S4. As mentioned above, the measurement result includes at least the discharging date and time, waveform information, and the discharge source (the engine generator 38 or the storage battery 40). The charging result includes at least the charging date and time and the charged amount. Next, in S22, the processing unit 21 calculates feature amount based on the received measurement result, and compares the calculation result with a feature amount map of the database 26 to estimate the type of electrical device 6 that is connected to the electric generator 3. In a case where a feature amount map that matches the result for comparison does not exist, the processing unit 21 determines that the connected device is a device other than a designated device, and updates the database 24 on the assumption that a new type of electrical device is connected.

Next, in S23, the processing unit 21 analyzes the charging/discharging at the electric generator 3, based on the charging result and measurement result transmitted from the electric generator 3. In this case, for example, the processing unit 21 counts the number of times that charging and discharging were performed based on the aforementioned two items of information, and generates charging/discharging information that includes the count information. Note that, the processing unit 21 may analyze other parameters associated with charging/discharging, and generate the obtained results as charging/discharging information. Next, in S24, the processing unit 21 executes user treatment processing. The user treatment processing is processing for determining the treatment with respect to the user based on the electrical device estimated in S22 and the charging/discharging information generated in S23. Specifically, the processing unit 21 determines the user treatment based on information regarding the electrical device that is estimated to be connected in S22, and information of the databases 24 and 25 (treatment ID and user treatment).

Next, in S25, the processing unit 21 calculates the current rental fee based on the waveform information received in S21 and the user treatment determined in S24. Although the rental fee fundamentally increases in proportion to the electric power supply amount, a surcharge or discount is set according to the user treatment that is determined in accordance with whether or not a designated connected device or usage method is used, and is calculated using these items of information. The details regarding calculation of the rental fee are described later using FIG. 7.

Next, in S26, the processing unit 21 transmits response information to respond to the information received in S21 to the electric generator 3. At least the type of electrical device estimated in S22, information regarding the user treatment determined in S24, and the rental fee calculated in S25 are included in the response information, and as necessary the aforementioned warning information or the like is included in the information regarding the user treatment. Next, in S27, the processing unit 21 updates the database 24 based on these items of information, and then ends the present processing flow.

<Processing for Calculating Rental Fee>

Figure 7:
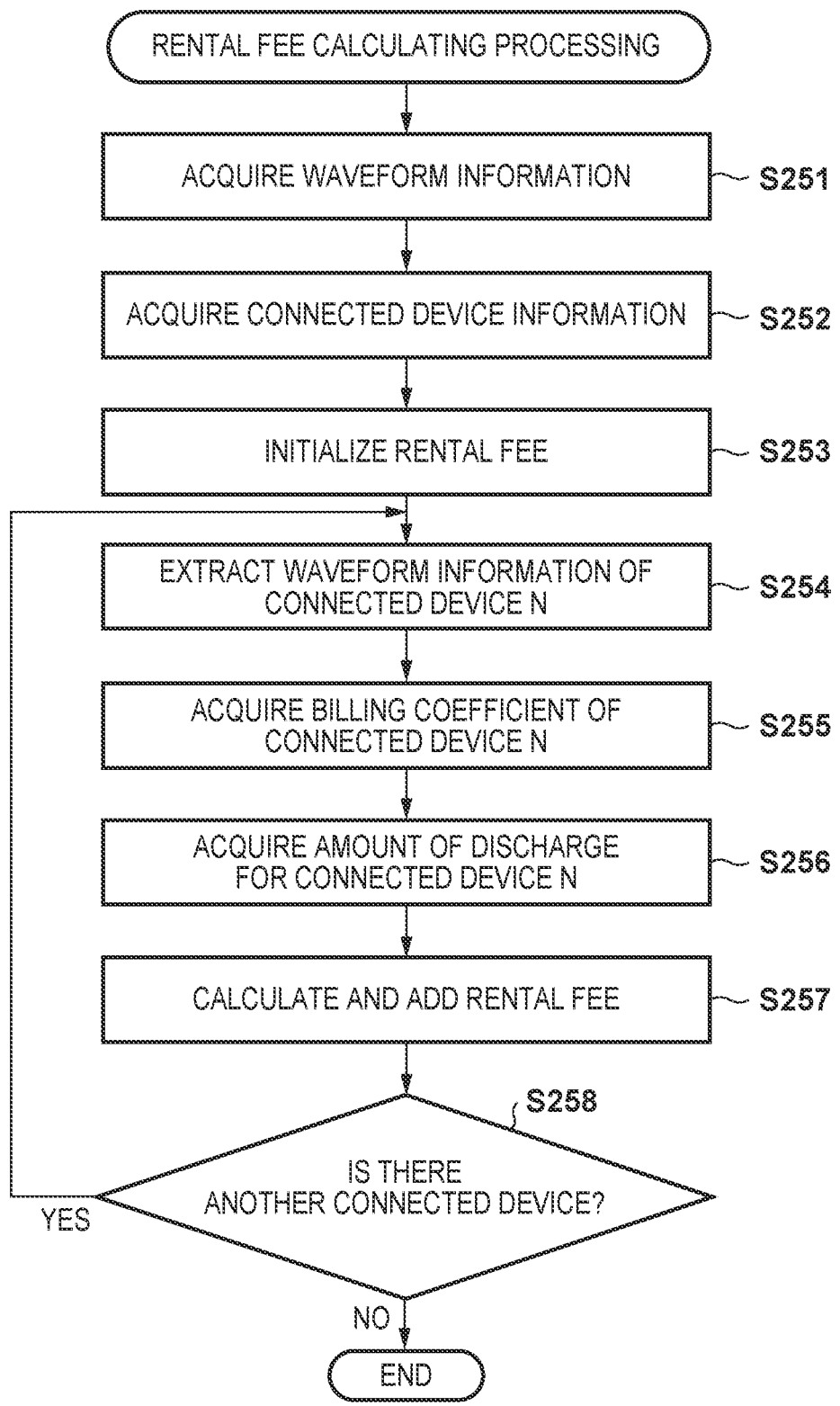
FIG. 7 is a flowchart illustrating an example of processing executed as rental fee calculation processing by the information processing apparatus.

Next, the processing for calculating the rental fee that is executed in the aforementioned S25 at the information processing apparatus 2 will be described referring to FIG. 7. The processing described hereunder is implemented by, for example, the processing unit 21 reading a control program that is stored in advance on the ROM or HDD of the storage unit 22 to the RAM and executing the control program.

In S251, the processing unit 21 acquires the waveform information of the electric generator 3 received in S21. Next, in S252, the processing unit 21 acquires information regarding the connected device estimated in S22. Subsequently, in S253, the processing unit 21 initializes the rental fee. In this case, the initialization is executed only at the time that the initial measurement result has been transmitted from the electric generator 3. The reason is that, as mentioned above, because a measurement result is intermittently transmitted to the information processing apparatus 2 in the present embodiment, each time a measurement result is transmitted, a charge that is based on the measurement result is added to the rental fee, and hence it is not necessary to initialize the rental fee from the second time onward. Note that, as described in another embodiment to be described later, in a case where the electric generator 3 does not have a communication function, measurement results stored in the electric generator 3 are read en bloc when the relevant electric generator 3 is returned, and therefore the processing in the flowcharts in FIG. 6 and FIG. 7 is only executed once. In such a case, the initialization processing in S253 is executed without fail.

Next, in S254, the processing unit 21 acquires waveform information for a connected device N from the waveform information acquired in S251. The reason for this is that it is possible that a plurality of electrical devices are connected to the electric generator 3 at the same time, and there is also a possibility that the connected device information acquired in S252 is information according to a plurality of connected devices, and therefore the relevant connected device is referred to as "connected device N". That is, the processing from S254 to S257 is processing with respect to a single connected device. Accordingly, in a case where there is a plurality of connected devices, the processing from S254 to S257 will be repeated the same number of times as the number of connected devices.

Next, in S255, the processing unit 21 acquires the billing coefficient for the estimated connected device from the database 24. Note that, in this case, there is also a possibility that the estimated connected device is an unknown connected device. The term "unknown connected device" refers to an electrical device other than the connected devices that are managed by the database 24 of the information processing apparatus 2. In such a case, the processing unit 21 may determine the billing coefficient for the unknown connected device to be the same as the billing coefficient of a connected device that exhibits a similar waveform among the connected devices which are already being managed, based on the waveform information of the unknown connected device in question. Alternatively, the processing unit 21 may determine a uniform billing coefficient, for example, a rate of 1.5 times the standard rate, with respect to the unknown connected device.

Next, in S256, the processing unit 21 acquires the amount of discharge (electric power supply amount) for the connected device N from the waveform information extracted in S254. Specifically, since a measurement result regarding an output current and an output voltage with respect to time is included in the waveform information, the amount of discharge can be determined by means of the cumulative values for these values. Subsequently, in S257, the processing unit 21 calculates a rental fee for the connected device N with the waveform information acquired based on the billing coefficient as well as based on the amount of discharge that were acquired in S255 and S256, and adds the rental fee to the rental fee initialized in S253.

Next, in S258, the processing unit 21 determines whether or not another connected device is included in the waveform information, and if another connected device is included, the processing unit 21 returns the processing to S254, while if another connected device is not included, the processing unit 21 ends the present processing flow. The determination in S258 is made based on the connected device information acquired in S252. In other words, the processing unit 21 determines whether or not the processing from S254 to S257 was executed for all of the electrical devices estimated in S22.

As described above, the rental system according to the present embodiment is constituted by including a portable electric generator configured to supply electric power to an electrical device that is detachably connected thereto, an information processing apparatus managing usage circumstances of the portable electric generator at a rental destination, and a terminal which a service provider that rents out the portable electric generator possesses. The information processing apparatus acquires information according to the usage circumstances of the portable electric generator, estimates the type of electrical device that is connected based on a measurement result with respect to a voltage and a current when the portable electric generator supplied electric power that is included in the information according to the usage circumstances, and uses a billing coefficient that corresponds to the estimated electrical device as well as the measurement result to calculate a rental fee associated with the amount of electric power supplied by the portable electric generator at the rental destination. By this means, according to the present embodiment, the usage circumstances of the portable electric generator at the rental destination can be suitably acquired, and a suitable rental fee that is in accordance with the amount of generated electric power and the usage circumstances can be calculated. Hence, precise fee setting can be performed such as, for example, setting a surcharge for a high-load connected device, and setting a discounted charge for a connected device with respect to which the electric generator 3 is capable of stable operation. Further, in comparison to a case of calculating a rental fee according to the residual amount of fuel in the engine generator 38 or the residual capacity of the storage battery 40 when the electric generator 3 is returned, because the rental fee is calculated according to the amount of discharge of the engine generator 38, a rental fee that is more in accordance with the usage circumstances can be calculated.

<Modifications>

The present invention is not limited to the foregoing embodiment, and various changes are possible. For example, in the foregoing embodiment, an embodiment is described in which a connected device is estimated based on waveform information, and a rental fee is calculated using a billing coefficient corresponding to the estimated connected device. However, more detailed specification information can be analyzed based on the waveform information, and it is possible to calculate a more precise charge that is in accordance with the analysis results.

Figure 10:
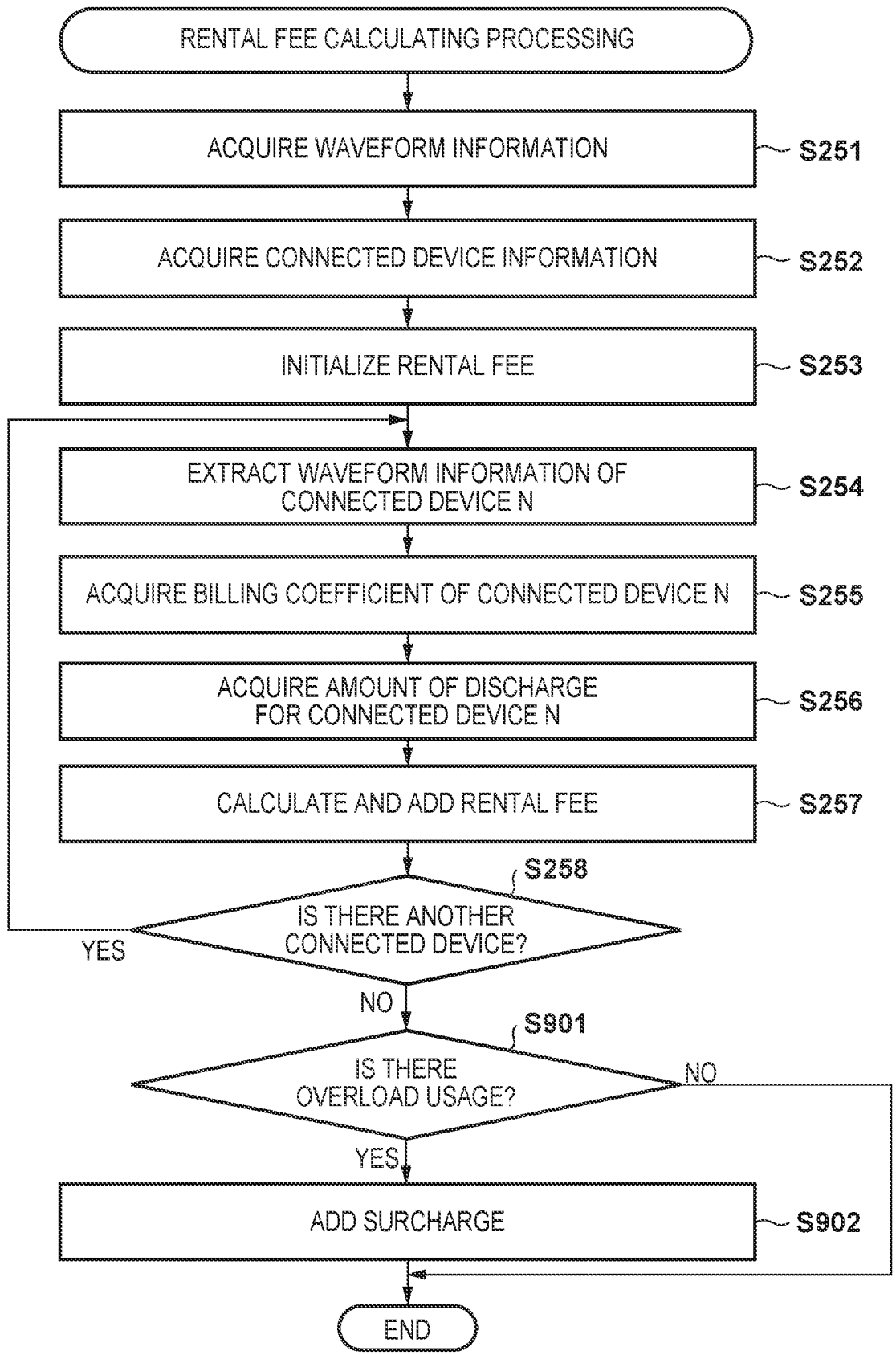
FIG. 10 is a flowchart illustrating an example of processing executed as rental fee calculation processing by the information processing apparatus.

A modification of processing for calculating the rental fee that is executed in the aforementioned S25 at the information processing apparatus 2 will now be described referring to FIG. 10. The processing described hereunder is implemented by, for example, the processing unit 21 reading a control program that is stored in advance on the ROM or HDD of the storage unit 22 to the RAM and executing the control program. Note that, processing that is the same as in the flowchart in FIG. 7 is denoted by the same step (S) number as in FIG. 7, and a description of such processing is omitted hereunder. That is, hereunder, the processing in S901 and S902 will be described.

When calculation of the rental fee relating to the estimated connected device (processing from S251 to S258) ends, in S901, based on the waveform information received in S21 the processing unit 21 determines whether or not usage at a high load was performed. The term "usage at a high load" refers to a case where, for example, usage at a predetermined value (rated output) or higher was performed for a predetermined time period or longer. In a case where there was overload usage, the processing unit 21 proceeds to S902, while if there was no overload usage the processing unit 21 ends the present processing flow. In S902, the processing unit 21 adds an additional charge for the overload usage to the rental fee, and then ends the present processing flow.

Although the electric generator 3 can supply electric power even if the rated output is exceeded and there is a power difference of a certain extent, deterioration of respective components will be severe in addition to the normal output. Further, a plurality of electrical devices can be connected to the electric generator 3, and even if the supplied power to one electrical device is not more than the rated output, in some cases the total of the supplied power to a plurality of electrical devices will exceed the rated output. For usage such as this in which the total of the supplied power to a plurality of electrical devices exceeds the rated output, such overload usage cannot be taken into account in the calculation of a rental fee for individual connected devices in the processing from S254 to S257. Therefore, in the present modification, after the rental fees are calculated for the individual connected devices, a surcharge with respect to the overall usage circumstances is calculated to thereby enable more precise fee setting.

Second Embodiment

A second embodiment of the present invention is described hereunder. In the above first embodiment, an example was described in which, fundamentally, sending and receiving of information is performed by communication between the electric generator 3 and the information processing apparatus 2 that is a management server. Note that, in a case where a communication function is provided in the electric generator 3, the influence on the production cost and power consumption and the like of the apparatus is significant, and in addition, because the electric generator 3 is a portable type, situations may arise in which the electric generator 3 is used at a location that is outside the communication range with respect to radio communication. If communication cannot be performed, the fine control described above cannot be performed. Therefore, to solve this problem, in the present embodiment a rental system 1001 in a case where a portable electric generator is not equipped with a communication function will be described.

<System Configuration>

Figure 11:
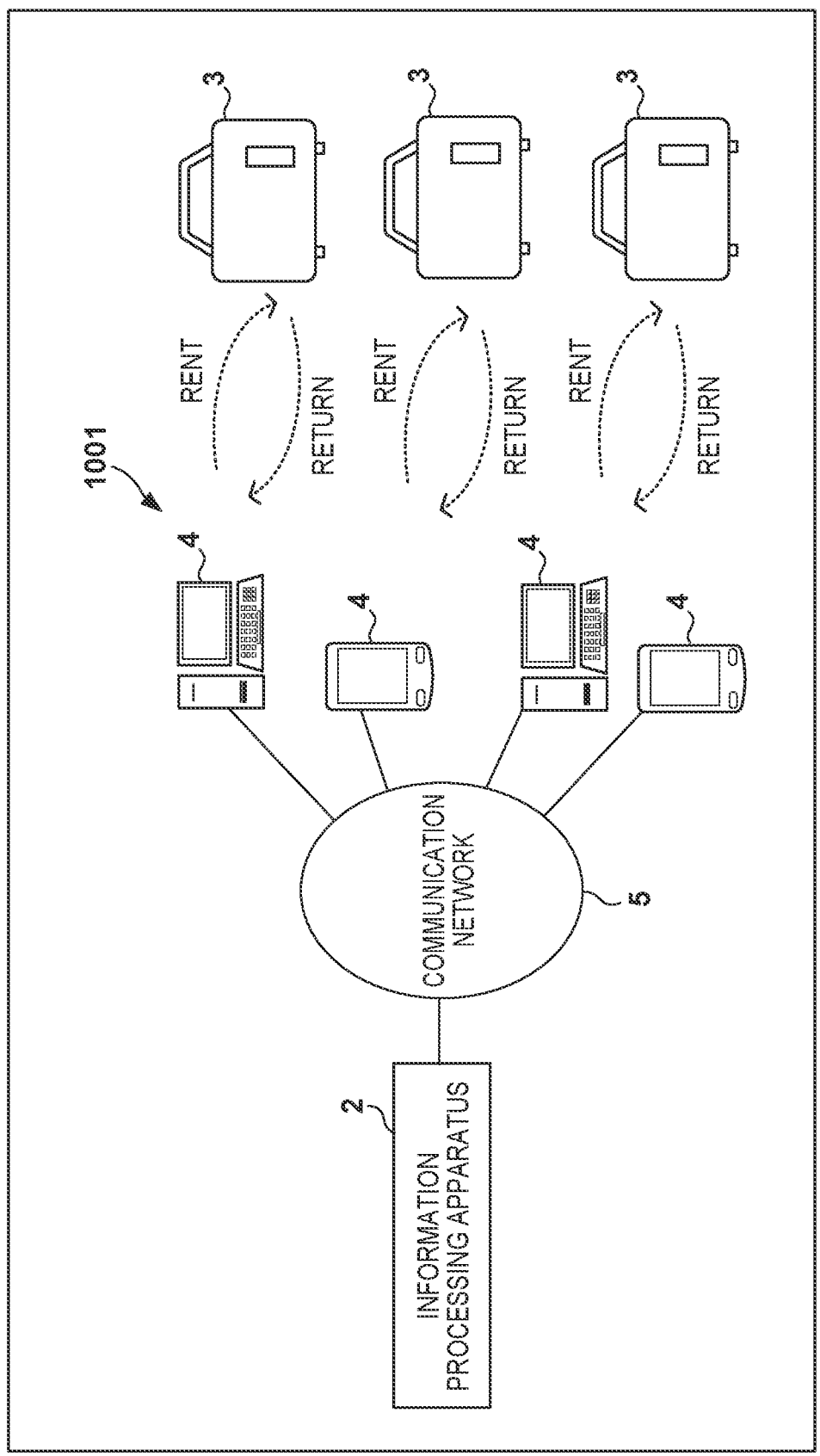
FIG. 11 is a schematic diagram of a rental system according to one embodiment of the present invention.

FIG. 11 is a schematic diagram of the rental system 1001. A description of the configuration and control of the rental system 1001 that are the same as in the foregoing first embodiment will be omitted here. As illustrated in FIG. 10, in the rental system 1001, the information processing apparatus 2 and a plurality of the terminals 4 are communicably connected through the communication network 5. On the other hand, unlike the above first embodiment, because the plurality of electric generators 3 do not have a communication function, the usage circumstances of an electric generator 3 that was rented from a service provider is not known until the electric generator 3 is returned to the relevant service provider. Therefore, at the timing at which the electric generator 3 is returned, information stored in the electric generator 3 is read, and is transferred from the terminal 4 to the information processing apparatus 2.

<Portable Electric Generator>

Figure 12:
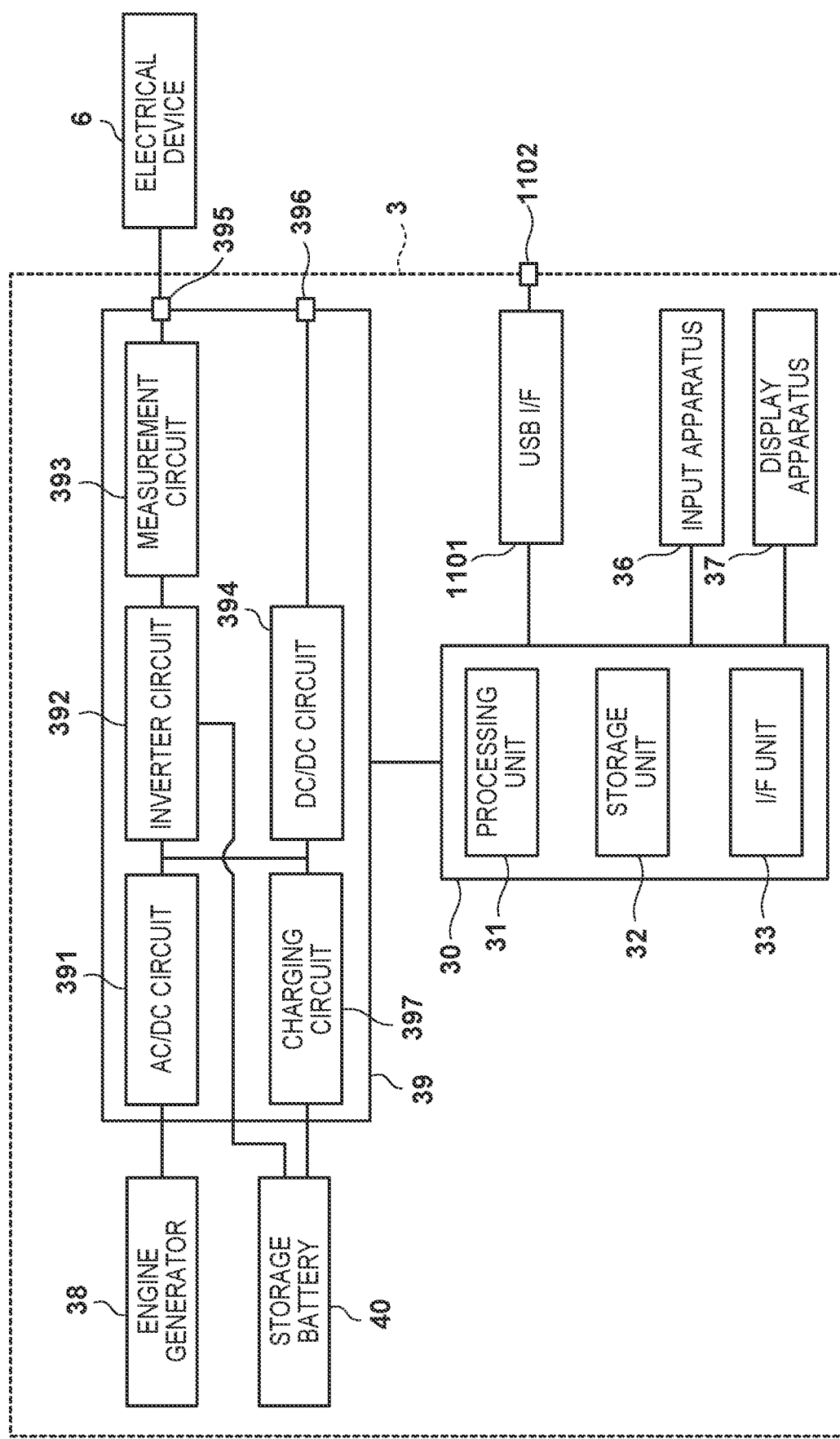
FIG. 12 is a block diagram of a portable electric generator according to one embodiment of the present invention.

FIG. 12 is a block diagram of the electric generator 3. The electric generator 3 of the present embodiment is equipped with a USB I/F 1101 and a connector 1102 instead of the GPS sensor 34 and the communication apparatus 35 that are provided in the above first embodiment. The remaining configuration is the same as in the above first embodiment, and hence a detailed description thereof will be omitted here.

A USB cable is connected to the connector 1102, and information stored in the storage unit 32 can be read through the USB I/F 1101. When the electric generator 3 is returned to the service provider, the terminal 4 and the electric generator 3 are connected using the USB cable, and information accumulated in the storage unit 32 is read to the terminal 4. The read information is transferred to the information processing apparatus 2.

Figure 6:
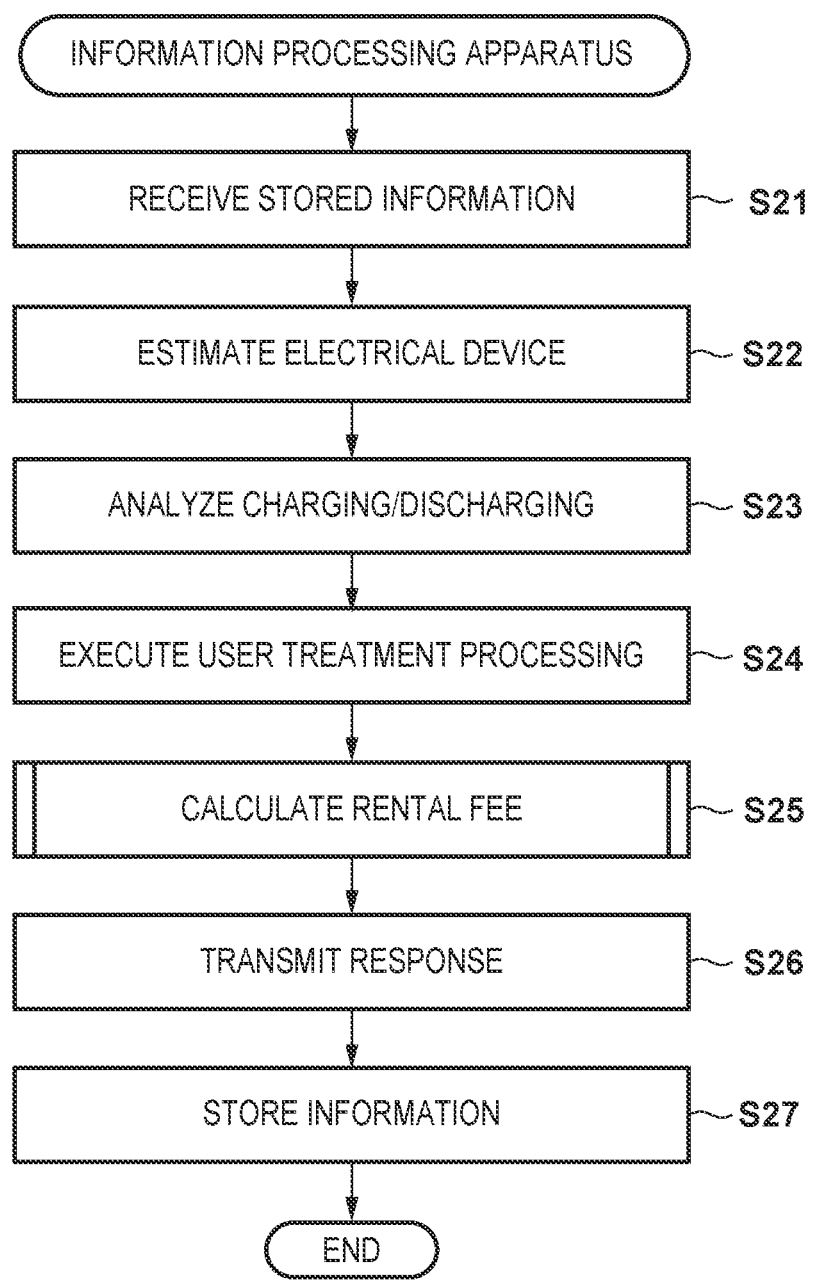
FIG. 6 is a flowchart illustrating an example of processing executed by the information processing apparatus.

The information processing apparatus 2 according to the present embodiment executes basically the same processing as in the flowchart illustrated in FIG. 6. The portions of the processing which differ from the flowchart illustrated in FIG. 6 are that stored information transferred from the terminal 4 is received in S21, and that a response transmission is transmitted to the terminal 4 in S26. Note that, in the present embodiment, because the processing is executed after the electric generator 3 is returned, the screen information and the like illustrated in FIG. 8 and FIG. 9 is not generated. That is, with respect to the flowchart illustrated in FIG. 7, only the user treatment and the rental fee are determined according to the stored information, and screen information such as a warning screen is not generated.

As described above, in the rental system according to the present embodiment, the portable electric generator is equipped with a USB interface. Further, information according to the usage circumstances that is stored in the portable electric generator is read through the USB interface to the terminal of the service provider that rented out the portable electric generator, when the relevant portable electric generator is returned. The information processing apparatus receives the stored information through a network from the terminal after the portable electric generator is returned to the service provider. According to the present embodiment, an inexpensive electric generator 3 can be provided, and a rental fee can be precisely calculated according to the usage circumstances of the electrical device.

Other Embodiment

Other Example of Configuration of Electric Generator

Although in the foregoing embodiments the electric generator 3 illustrated in FIG. 2 is configured to include the engine generator 38 and the storage battery 40, the present invention is not limited thereto. FIG. 13 illustrates an electric generator 3 for which a configuration is adopted that does not include the storage battery 40 and is only equipped with the engine generator 38. Note that, the respective processing operations do not differ from the foregoing embodiments, and hence a description of the processing will be omitted here. Note that, similarly to the above second embodiment, a configuration may be adopted that is equipped with the USB/F 1101 instead of the GPS sensor 34 and the communication apparatus 35.

<Summary of Embodiments>

1. An information processing apparatus (for example, 2) of the above embodiments that manages the usage circumstances at a rental destination of a portable electric generator (for example, 3) configured to supply electric power to a detachably connected electrical device includes:

an acquisition unit (for example, 23, S21) configured to acquire information according to the usage circumstances of the portable electric generator;

an estimation unit (for example, 21, S22) configured to estimate the type of electrical device that is connected, based on a measurement result with respect to a voltage and a current when the portable electric generator supplied electric power that is included in the information according to the usage circumstances; and a calculation unit (for example, 25, S251 to S258) configured to calculate a rental fee associated with an electric power amount supplied by the portable electric generator at the rental destination, using a billing coefficient corresponding to the electrical device estimated by the estimation unit and the measurement result.

According to this embodiment, a rental fee can be precisely calculated in accordance with the usage circumstances of the electric generator 3 at the rental destination, and the user can be encouraged to appropriately utilize the electric generator 3. Further, in comparison to a case of calculating a rental fee according to the residual amount of fuel in the engine generator 38 or the residual capacity of the storage battery 40 when the electric generator is returned, because the rental fee is calculated according to the amount of discharge of the engine generator 38, a rental fee that is more in accordance with the usage circumstances can be calculated.

2. In the above-mentioned embodiment, the portable electric generator includes a communication unit (for example, 35) configured to perform radio communication with the information processing apparatus, and the acquisition unit receives, from the portable electric generator, the information according to the usage circumstances that is transmitted through the communication unit, in a period in which the portable electric generator is supplying electric power.

According to this embodiment, when the portable electric generator is supplying electric power, information according to the usage circumstances can be acquired in real time, and calculation of a rental fee can be performed in real time.

3. The information processing apparatus of the above-mentioned embodiment further includes:

a notification unit (S26) configured to notify warning information to the portable electric generator in a case where a billing coefficient corresponding to the estimated electrical device is a surcharge.

According to this embodiment, notification of a warning to the user can be performed in real time.

4. In the above-mentioned embodiment, the warning information includes screen information of a warning screen that is displayed on a display apparatus provided in the portable electric generator, and information indicating that a surcharge will be imposed is displayed on the warning screen, and a choice regarding whether to continue supplying electric power or stop supplying electric power to the estimated electrical device is displayed in a selectable manner on the warning screen (for example, FIG. 8).

According to this embodiment, even in a case where a high-load electrical device is connected, the user can select whether or not to continue to use the portable electric generator, and thus control that takes into consideration the intention of the user can be carried out, and there is the effect that the occurrence of trouble with regard to the user when the portable electric generator is returned is suppressed by notifying the user in advance indicating that a surcharge will be imposed.

5. In the above-mentioned embodiment, the calculation unit further adds an additional surcharge to the rental fee in a case where the measurement result indicates that supply of electric power exceeding a rated output of the portable electric generator was performed for a time period exceeding a predetermined time period or more (for example, S901, S902).

According to this embodiment, in addition to calculating a rental fee for an individual connected device, by calculating a surcharge with respect to the overall usage circumstances, more precise fee setting can be performed.

6. In the above-mentioned embodiment,
the portable electric generator includes a USB interface (for example, 1101);
the information according to the usage circumstances that is stored in the portable electric generator is read through the USB interface to a terminal of a service provider that rented out the portable electric generator, when the portable electric generator is returned; and
after the portable electric generator is returned to the service provider, the acquisition unit receives the information according to the usage circumstances through a network from the terminal.

According to this embodiment, a rental fee can be precisely calculated according to the connected electrical devices and the usage circumstances at the rental destination, while suppressing the production cost of the portable electric generator.

7. In the above-mentioned embodiment,
the portable electric generator includes a storage battery (for example, 40); and
the portable electric generator supplies electric power from at least one of the engine generator (for example, 38) or the storage battery.

According to this embodiment, the present invention can be utilized in various forms, and restrictions due to the configuration can be suppressed and a free design can be allowed.

8. An information processing method for managing usage circumstances at a rental destination of a portable electric generator configured to supply electric power to a detachably connected electrical device of the above-mentioned embodiment includes:
acquiring information according to the usage circumstances of the portable electric generator;
estimating a type of an electrical device that is connected, based on a measurement result with respect to a voltage and a current when the portable electric generator supplied electric power that is included in the information according to the usage circumstances; and
calculating a rental fee associated with an electric power amount supplied by the portable electric generator at the rental destination, using a billing coefficient corresponding to an electrical device that is estimated by the estimating, and the measurement result.

According to this embodiment, a rental fee can be precisely calculated in accordance with the usage circumstances of the electric generator 3 at the rental destination, and the user can be encouraged to appropriately utilize the electric generator 3. Further, in comparison to a case of calculating a rental fee according to the residual amount of fuel in the engine generator 38 or the residual capacity of the storage battery 40 when the electric generator is returned, because the rental fee is calculated according to the amount of discharge of the engine generator 38, a rental fee that is more in accordance with the usage circumstances can be calculated.

9. A non-transitory computer-readable storage medium storing a program that operates in an information processing apparatus managing usage circumstances at a rental destination of a portable electric generator configured to supply electric power to a detachably connected electrical device of the above-mentioned embodiment includes:
an acquisition step of acquiring information according to the usage circumstances of the portable electric generator;
an estimation step of estimating a type of an electrical device that is connected, based on a measurement result with respect to a voltage and a current when the portable electric generator supplied electric power that is included in the information according to the usage circumstances; and
a calculation step of calculating a rental fee associated with an electric power amount supplied by the portable electric generator at the rental destination, using a billing coefficient corresponding to an electrical device that is estimated in the estimation step, and the measurement result.

According to this embodiment, a rental fee can be precisely calculated in accordance with the usage circumstances of the electric generator 3 at the rental destination, and the user can be encouraged to appropriately utilize the electric generator 3. Further, in comparison to a case of calculating a rental fee according to the residual amount of fuel in the engine generator 38 or the residual capacity of the storage battery 40 when the electric generator is returned, because the rental fee is calculated according to the amount of discharge of the engine generator 38, a rental fee that is more in accordance with the usage circumstances can be calculated.

10. The portable electric generator configured to supply electric power to a detachably connected electrical device of the above-mentioned embodiment includes:
at least one of a generator and a storage battery configured to supply electric power to the connected electrical device (for example, 38, 40);
a measurement unit for measuring a voltage and a current when electric power is supplied by at least one of the generator and the storage battery (for example, 397, 393);
a transmission unit for transmitting a measurement result that is measured by the measurement unit to a communicably connected external apparatus (for example, 35); and
a control unit configure to, upon receiving from the external apparatus a response to the transmission by the transmission unit, in a case where warning information is included in response information that is received, display information indicating that a surcharge will be imposed on a display unit as information for a user (for example, 31).

According to this embodiment, when the portable electric generator is supplying electric power, information according to the usage circumstances can be transmitted to an external apparatus in real time, and warning information in accordance with a response from the information processing apparatus can be presented to the user.

11. The portable electric generator configured to supply electric power to a detachably connected electrical device of the above-mentioned embodiment comprises:
at least one of an engine generator and a storage battery configured to supply electric power to the connected electrical device (for example, 38, 40);
a measurement unit configure to measure a voltage and a current when electric power is supplied to the connected electrical device by at least one of the engine generator and the storage battery (for example, 397, 393); and
a storage unit configured to store waveform information according to a voltage and a current measured by the measurement unit, and information according to charging and discharging (for example, 32), wherein the waveform information and the information according to charging and discharging are used for estimating a type of the connected electrical device and usage circumstances of the connected electrical device, and a rental fee of the portable electric generator is calculated based on the type of the connected electrical device and the usage circumstances of the estimated electrical device.

According to this embodiment, a rental fee can be precisely calculated according to the connected electrical devices and the usage circumstances at the rental destination, while suppressing the cost of producing the portable electric generator.

12. In a rental system that includes the portable electric generator configured to supply electric power to a detachably connected electrical device, and the information processing apparatus managing usage circumstances of the portable electric generator at a rental destination according to the above-mentioned embodiment, the portable electric generator includes:

at least one of an engine generator and a storage battery configured to supply electric power to the connected electrical device;

a measurement unit configured to measure a voltage and a current when electric power is supplied by at least one of the engine generator and the storage battery;

a transmission unit configured to transmit a measurement result that is measured by the measurement unit to a communicably connected external apparatus; and a control unit configured to, upon receiving from the external apparatus a response to the transmission by the transmission unit, in a case where warning information is included in response information that is received, display information indicating that a surcharge will be imposed on a display unit as information for the user, and the information processing apparatus includes:

an acquisition unit configured to acquire information according to the usage circumstances of the portable electric generator;

an estimation unit configured to estimate the type of electrical device that is connected, based on a measurement result with respect to a voltage and a current when the portable electric generator supplied electric power that is included in the information according to the usage circumstances;

a calculation unit configured to calculate a rental fee associated with an electric power amount supplied by the portable electric generator at a rental destination, using a billing coefficient corresponding to the electrical device estimated by the estimation unit and the measurement result; and a notification unit configured to notify a rental fee that is calculated by the calculation unit to the portable electric generator.

According to this embodiment, a rental fee can be precisely calculated in accordance with the usage circumstances of the electric generator 3 at the rental destination, and the user can be encouraged to appropriately utilize the electric generator 3. Further, in comparison to a case of calculating a rental fee according to the residual amount of fuel in the engine generator 38 or the residual capacity of the storage battery 40 when the electric generator is returned, because the rental fee is calculated according to the amount of discharge of the engine generator 38, a rental fee that is more in accordance with the usage circumstances can be calculated.

The present invention is not limited to the above embodiments and various changes and modifications can be made within the spirit and scope of the present invention. Therefore, to apprise the public of the scope of the present invention, the following claims are made.

What is claimed is:

1. An information processing apparatus managing usage circumstances at a rental destination of a portable electric generator configured to supply electric power to an electrical device detachably connected to the portable electric generator, the apparatus comprising:

a first storage device that stores instructions; and at least one first processor that executes the instructions to:

read out information according to the usage circumstances stored in a second storage device provided in the portable electric generator;

estimate a type of the electrical device that is detachably connected, based on a measurement result with respect to a voltage and a current when the portable electric generator supplied electric power that is included in the information according to the usage circumstances; and calculate a rental fee associated with an electric power amount supplied by the portable electric generator at the rental destination, using a billing coefficient corresponding to an electrical device that is estimated, and the measurement result, wherein the portable electric generator comprises:

at least one of an engine generator and a storage battery configured to supply electric power to the electrical device, a measurement unit configured to measure a voltage and a current when electric power is supplied by at least one of the engine generator and the storage battery, the second storage device storing instructions and storing a measurement result that is measured by the measurement unit as the information according to the usage circumstances; and at least one second processor that executes the instructions to:

read out a measurement result stored in the second storage device, and transmit the read out measurement result to a communicably connected external apparatus, and upon receiving a response to the transmission of the measurement result from the external apparatus, in a case where warning information is included in response information that is received, display information indicating that a surcharge will be imposed as information for a user on a display unit.

2. The information processing apparatus according to claim 1, wherein the portable electric generator comprises a communication apparatus that performs a radio communication with the information processing apparatus; and the at least one processor executes instructions in the storage device to:

receive the information according to the usage circumstances that is transmitted through the communication apparatus from the portable electric generator during a period in which the portable electric generator is supplying electric power.

3. The information processing apparatus according to claim 2, wherein the at least one processor executes instructions in the first storage device to:

notify warning information to the portable electric generator in a case where a billing coefficient corresponding to the estimated electrical device is a surcharge.

4. The information processing apparatus according to claim 3, wherein
the warning information includes screen information of a warning screen that is displayed on a display apparatus provided in the portable electric generator, and
information indicating that a surcharge will be imposed is displayed on the warning screen, and a choice regarding whether to continue supplying electric power or stop supplying electric power to the estimated electrical device is displayed in a selectable manner on the warning screen.

5. The information processing apparatus according to claim 1, wherein
the at least one processor executes instructions in the first storage device to:
add an additional surcharge to the rental fee in a case where the measurement result indicates that supply of electric power exceeding a rated output of the portable electric generator was performed for a time period exceeding a predetermined time period or more.

6. The information processing apparatus according to claim 1, wherein
the portable electric generator comprises a USB interface;
the information according to the usage circumstances that is stored in the second storage device of the portable electric generator is read through the USB interface to a terminal of a service provider that rented out the portable electric generator, when the portable electric generator is returned; and
the at least one processor executes instructions in the first storage device to, after the portable electric generator is returned to the service provider, receive the information according to the usage circumstances from the terminal through a network.

7. The information processing apparatus according to claim 1, wherein
the portable electric generator includes a storage battery, and
the portable electric generator supplies electric power from at least one of an engine generator or the storage battery.

8. An information processing method for an information processing apparatus managing usage circumstances at a rental destination of a portable electric generator configured to supply electric power to an electrical device detachably connected to the portable electric generator, the method comprising:
reading out information according to the usage circumstances stored in a second storage device provided in the portable electric generator;
estimating a type of the electrical device that is detachably connected, based on a measurement result with respect to a voltage and a current when the portable electric generator supplied electric power that is included in the information according to the usage circumstances; and
calculating a rental fee associated with an electric power amount supplied by the portable electric generator at the rental destination, using a billing coefficient corresponding to the estimated electrical device, and the measurement result
wherein the portable electric generator comprises:
at least one of an engine generator and a storage battery configured to supply electric power to the electrical device,
a measurement unit configured to measure a voltage and a current when electric power is supplied by at least one of the engine generator and the storage battery,
the second storage device storing instructions and storing a measurement result that is measured by the measurement unit as the information according to the usage circumstances; and
the method further comprising:
reading out a measurement result stored in the second storage device, and
transmitting the read out measurement result to a communicably connected external apparatus, and
upon receiving a response to the transmission of the measurement result from the external apparatus, in a case where warning information is included in response information that is received, displaying information indicating that a surcharge will be imposed as information for a user on a display unit.

9. A non-transitory computer-readable storage medium storing a program for causing a computer to execute each process in a method of controlling an information processing apparatus managing usage circumstances at a rental destination of a portable electric generator configured to supply electric power, the method comprising:
reading out information according to the usage circumstances stored in a second storage device provided in the portable electric generator;
estimating a type of an electrical device that is detachably connected to the portable electric generator, based on a measurement result with respect to a voltage and a current when the portable electric generator supplied electric power that is included in the information according to the usage circumstances; and
calculating a rental fee associated with an electric power amount supplied by the portable electric generator at the rental destination, using a billing coefficient corresponding to the estimated electrical device, and the measurement result,
wherein the portable electric generator comprises:
at least one of an engine generator and a storage battery configured to supply electric power to the electrical device,
a measurement unit configured to measure a voltage and a current when electric power is supplied by at least one of the engine generator and the storage battery,
the second storage device storing instructions and storing a measurement result that is measured by the measurement unit as the information according to the usage circumstances; and
the method further comprising:
reading out a measurement result stored in the second storage device, and
transmitting the read out measurement result to a communicably connected external apparatus, and
upon receiving a response to the transmission of the measurement result from the external apparatus, in a case where warning information is included in response information that is received, displaying information indicating that a surcharge will be imposed as information for a user on a display unit.

10. A portable electric generator configured to supply electric power to an electrical device detachably connected to the portable electric generator, the portable electric generator comprising:

at least one of an engine generator and a storage battery configured to supply electric power to the electrical device detachably connected to the portable electric generator;
a measurement unit configured to measure a voltage and a current when electric power is supplied by at least one of the engine generator and the storage battery;
a first storage device that stores instructions, and stores a measurement result that is measured by the measurement unit as information according to usage circumstances at a rental destination of the portable electric generator; and
at least one processor that executes the instructions to:
read out the measurement result stored in the first storage device, and transmit the read out measurement result to a communicably connected external apparatus; and
upon receiving a response to the transmission from the external apparatus, in a case where warning information is included in response information that is received, display information indicating that a surcharge will be imposed as information for a user on a display unit;
wherein the portable electric generator is in data communication with an information processing apparatus, the information processing apparatus comprising:
a second storage device that stores instructions; and
at least one second processor that executes the instructions to:
acquire information according to the usage circumstances of the portable electric generator,
estimate a type of the electrical device detachably connected to the portable electric generator, based on a measurement result with respect to a voltage and a current when the portable electric generator supplied power which is included in the information according to the usage circumstances,
calculate a rental fee associated with an electric power amount supplied by the portable electric generator at the rental destination, using a billing coefficient corresponding to the estimated electrical device, and the measurement result, and
notify a calculated rental fee to the portable electric generator.

11. A portable electric generator configured to supply electric power to an electrical device detachably connected to the portable electric generator, the portable electric generator comprising:
at least one of an engine generator and a storage battery configured to supply electric power to the electrical device detachably connected to the portable electric generator;
a measurement unit configured to measure a voltage and a current when electric power is supplied to the detachably connected electrical device by at least one of the engine generator and the storage battery; and
a storage device that stores instructions and stores waveform information according to a voltage and a current measured by the measurement unit, and information according to charging and discharging;
at least one processor that executes the instructions to:
read out the waveform information and the information according to charging and discharging stored in the first storage device, and transmit the read out waveform information and the information according to charging and discharging to a communicably connected external apparatus, and
upon receiving a response to the transmission of the waveform information from the external apparatus, in a case where warning information is included in response information that is received, display information indicating that a surcharge will be imposed as information for a user on a display unit,
wherein:
the waveform information and the information according to charging and discharging are used for estimating a type of the detachably connected electrical device and usage circumstances of the detachably connected electrical device, and
a rental fee of the portable electric generator is calculated based on the type of the detachably connected electrical device and the usage circumstances of the detachably connected electrical device.

12. A rental system including a portable electric generator configured to supply electric power to an electrical device detachably connected to the portable electric generator, and an information processing apparatus managing usage circumstances of the portable electric generator at a rental destination:
the portable electric generator comprising:
at least one of an engine generator and a storage battery configured to supply electric power to the electrical device detachably connected to the portable electric generator,
a measurement unit configured to measure a voltage and a current when electric power is supplied by at least one of the engine generator and the storage battery,
a first storage device that stores instructions and stores a measurement result that is measured by the measurement unit as information according to the usage circumstances at a rental destination of the portable electric generator; and
at least one first processor that executes the instructions to:
read out a measurement result stored in the first storage device, and transmit the read out measurement result to a communicably connected external apparatus, and
upon receiving a response to the transmission of the measurement result from the external apparatus, in a case where warning information is included in response information that is received, display information indicating that a surcharge will be imposed as information for a user on a display unit, and the information processing apparatus comprising:
a second storage device that stores instructions; and
at least one second processor that executes the instructions to:
acquire information according to the usage circumstances of the portable electric generator,
estimate a type of the electrical device detachably connected to the portable electric generator, based on a measurement result with respect to a voltage and a current when the portable electric generator supplied power which is included in the information according to the usage circumstances,
calculate a rental fee associated with an electric power amount supplied by the portable electric generator at the rental destination, using a billing coefficient corresponding to the estimated electrical device, and the measurement result, and notify a calculated rental fee to the portable electric generator.

\* \* \* \* \*